United States Patent
Patil et al.

(10) Patent No.: US 10,111,160 B2
(45) Date of Patent: Oct. 23, 2018

(54) NAN DATA LINK MULTI-HOP TOPOLOGY

(71) Applicant: QUALCOMM Incorporated, San Diego, CA (US)

(72) Inventors: Abhishek Pramod Patil, San Diego, CA (US); George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/467,993

(22) Filed: Mar. 23, 2017

(65) Prior Publication Data

US 2017/0280377 A1    Sep. 28, 2017

Related U.S. Application Data

(60) Provisional application No. 62/312,949, filed on Mar. 24, 2016, provisional application No. 62/312,833, filed on Mar. 24, 2016.

(51) Int. Cl.

| | |
|---|---|
| *H04W 48/16* | (2009.01) |
| *H04L 12/24* | (2006.01) |
| *H04L 12/733* | (2013.01) |
| *H04W 12/04* | (2009.01) |
| *H04L 29/06* | (2006.01) |
| *H04W 12/02* | (2009.01) |
| *H04W 4/00* | (2018.01) |
| *H04W 84/18* | (2009.01) |
| *H04W 88/04* | (2009.01) |

(52) U.S. Cl.
CPC ............ *H04W 48/16* (2013.01); *H04L 41/12* (2013.01); *H04L 45/122* (2013.01); *H04L 63/065* (2013.01); *H04W 12/02* (2013.01); *H04W 12/04* (2013.01); *H04W 4/00* (2013.01); *H04W 84/18* (2013.01); *H04W 88/04* (2013.01)

(58) Field of Classification Search
None
See application file for complete search history.

(56) References Cited

U.S. PATENT DOCUMENTS

| | | | | |
|---|---|---|---|---|
| 2008/0062916 | A1* | 3/2008 | Mosko | H04L 45/18 370/328 |
| 2009/0072924 | A1* | 3/2009 | Uchimura | H01P 1/122 333/157 |

(Continued)

OTHER PUBLICATIONS

International Search Report and Written Opinion—PCT/US2017/024047—ISA/EPO—Jul. 17, 2017.

*Primary Examiner* — Steven H Nguyen
(74) *Attorney, Agent, or Firm* — Arent Fox, LLP and Qualcomm, Incorporated

(57) ABSTRACT

A method, an apparatus, and a computer-readable medium for wireless communication are provided. In one aspect, an apparatus is configured to determine that a multi-hop feature is enabled for a service and to transmit, based on the determination, a multi-hop attribute that may include at least one of an identifier provided by a publisher device or a hop count associated with the service. In another aspect, an apparatus is configured to determine a data scheduling protocol for a multi-hop service and to communicate with one or more wireless devices based on the determined data scheduling protocol.

16 Claims, 17 Drawing Sheets

(56) References Cited

U.S. PATENT DOCUMENTS

| | | | |
|---|---|---|---|
| 2009/0135824 A1* | 5/2009 | Liu | H04L 45/02 370/392 |
| 2012/0008515 A1* | 1/2012 | Jung | H04W 8/005 370/252 |
| 2013/0331097 A1* | 12/2013 | Kang | H04W 4/21 455/434 |
| 2014/0081840 A1* | 3/2014 | Blackhurst | G06Q 30/0207 705/39 |
| 2014/0171062 A1* | 6/2014 | Fallgren | H04W 40/22 455/422.1 |
| 2015/0081840 A1* | 3/2015 | Patil | H04L 67/28 709/217 |
| 2015/0164627 A1* | 6/2015 | Kawaura | A61B 17/0482 600/30 |
| 2015/0350906 A1 | 12/2015 | Patil et al. | |
| 2016/0073330 A1 | 3/2016 | Patil et al. | |

* cited by examiner

400 ⟶ Service Descriptor Attribute (SDA)

| Field | Description |
|---|---|
| Attribute ID | NAN Service Descriptor |
| Length | Length of the following fields in the attribute |
| Service ID | Contains a hash of the service name |
| Instance ID | Identifies the instance of the service (e.g., hi-def, low-def, std-def for videos) |
| Requestor Instance ID | Transaction ID associated with the SDA |
| Service Control | Indicates that the message is a publish type and includes service info and binding bitmap fields |
| Binding Bitmap | Points to the NDL attribute for this service |
| Service Info Length | Contains the length of the service info field |
| Service Info | Contains MAC address of the publisher (may indicate: multi-hop capability, max hop count) |

FIG. 4A

450 ⟶ Multi-Hop Attribute (MHA)

| Field | Description |
|---|---|
| Attribute ID | Multi-hop attribute using a reserved attribute ID |
| Length | Length of the following fields in the attribute |
| Service ID | Contains the hash of the service name |
| Instance ID | Identifies the instance of the service (e.g., hi-def, low-def, std-def for videos) |
| Requestor Instance ID | Transaction ID associated with the MHA |
| Service Control | Indicates that the message is a publish type and includes service info and binding bitmap fields |
| Binding Bitmap | Points to the NDL attribute for the proxied service |
| Service Info Length | Contains the length of the service info field |
| Service Info | Contains MAC address of the publisher (may indicate: max hop count, hop count from publisher) |

FIG. 4B

NDL Attribute

| Field | Description |
|---|---|
| Attribute ID | Identifies the type of NAN attribute; identifies the attribute as an NDL attribute |
| Length | Length of the following fields in the attribute |
| NDL Control | Control field for the NDL attribute |
| NDC ID | Points to the NAN data cluster |
| NDL ID | NDL identifier for the link (used if paging is required) |
| Immutable Schedule Tag | Points to immutable schedule attribute |
| QoS Tag | Points to QoS attribute |
| Map ID | Points to availability attribute associated with the NDL |
| Time Bitmap Control | Indicates the parameters associated with the following time bitmap field |
| Time Bitmap | Indicates an NDC base schedule for the NDL |

FIG. 5

NAN DATA LINK MULTI-HOP TOPOLOGY

CROSS-REFERENCE TO RELATED APPLICATION(S)

This application claims the benefit of U.S. Provisional Application Ser. No. 62/312,833, entitled "NAN DATA LINK MULTI-HOP TOPOLOGY" and filed on Mar. 24, 2016, and U.S. Provisional Application Ser. No. 62/312,949, entitled "NAN DATA LINK MULTI-HOP TOPOLOGY" and filed on Mar. 24, 2016, which are expressly incorporated by reference herein in their entirety.

BACKGROUND

Field

The present disclosure relates generally to communication systems, and more particularly, to neighbor awareness networking (NAN) data link (NDL) topology.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable media, and devices of the invention each have several aspects, no single one of which is solely responsible for the invention's desirable attributes. Without limiting the scope of this invention as expressed by the claims, which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., a station) for wireless communication. The apparatus is configured to determine that a multi-hop feature is enabled for a service and to transmit, based on the determination, a multi-hop attribute that includes an identifier provided by a publisher device and a hop count associated with the service.

Another aspect of this disclosure provides an apparatus for wireless communication. The apparatus may include means for means for determining that a multi-hop feature is enabled for a service and means for transmitting, based on the determination, a multi-hop attribute that includes an identifier provided by a publisher device and a hop count associated with the service.

Another aspect of this disclosure provides an apparatus for wireless communication. The apparatus may include a memory and at least one processor coupled to the memory. The at least one processor may be configured to determine that a multi-hop feature is enabled for a service and transmit, based on the determination, a multi-hop attribute that includes an identifier provided by a publisher device and a hop count associated with the service.

Another aspect of this disclosure provides a computer-readable medium of a first wireless device storing computer executable code. The computer-readable medium may include code to determine that a multi-hop feature is enabled for a service and to transmit, based on the determination, a multi-hop attribute that includes an identifier provided by a publisher device and a hop count associated with the service.

Another aspect of this disclosure provides an apparatus (e.g., a station) for wireless communication. The apparatus is configured to receive an information attribute from a second wireless device that indicates a multi-hop service is available from a publisher device and that includes an identifier identifying the publisher device of the multi-hop service. The apparatus is configured to determine to subscribe to the multi-hop service based on the received information attribute.

Another aspect of this disclosure provides an apparatus for wireless communication. The apparatus may include means for receiving an information attribute from a second wireless device that indicates a multi-hop service is available from a publisher device and that includes an identifier identifying the publisher device of the multi-hop service and means for determining to subscribe to the multi-hop service based on the received information attribute.

Another aspect of this disclosure provides an apparatus for wireless communication. The apparatus may include a memory and at least one processor. The at least one processor may be configured to receive an information attribute from a second wireless device that indicates a multi-hop service is available from a publisher device and that includes an identifier identifying the publisher device of the multi-hop service and to determine to subscribe to the multi-hop service based on the received information attribute.

Another aspect of this disclosure provides a computer-readable medium of a first wireless device storing computer executable code. The computer-readable medium may include code to receive an information attribute from a second wireless device that indicates a multi-hop service is available from a publisher device and that includes an identifier identifying the publisher device of the multi-hop service and to determine to subscribe to the multi-hop service based on the received information attribute.

Another aspect of this disclosure provides an apparatus (e.g., a station) for wireless communication. The apparatus is configured to determine parameters for indicating an availability of a multi-hop service associated with an NDL. The apparatus is configured to broadcast an information attribute that includes the determined parameters during a discovery window of a NAN.

In another aspect, the disclosure provides a method for wireless communication by a first wireless device. The method may include determining parameters for indicating an availability of a multi-hop service associated with an NDL and broadcasting an information attribute that includes the determined parameters during a discovery window of a NAN network. In an aspect, the determined parameters indicates that the multi-hop service supports multi-hop subscriptions, indicates a maximum hop count associated with the multi-hop service, and includes an identifier identifying the first wireless device. In another configuration, the method may further include receiving a path request to from a second wireless device associated with the NDL, determining a path to the second wireless device, and transmitting a path reply to the second wireless device along the determined path. In another aspect, the determined path is based on link quality metrics included in the path request. In another aspect, the path request and the path reply are encrypted by a common group key associated with the NDL. In another configuration, the method may include broadcasting an announcement message encrypted by a common group key associated with the NDL, receiving a path request from a second wireless device associated with the NDL, determining a path to the second wireless device based on the received path request, and transmitting a path reply to the second wireless device along the determined path. In an aspect, the determined path is based on link quality metrics included in the path request. In another aspect, the broadcasted announcement message and the path request are encrypted based on a common group key associated with the NDL. In another aspect, the information attribute is broadcasted with an NDL attribute within a service discovery frame during a NAN discovery window. In another aspect, the first wireless device is a member of a NAN cluster and shares a common set of NAN parameters with all other members of the NAN cluster associated with the service. In another aspect, the first wireless device is time synchronized with all the other members of the NAN cluster based on a timing synchronization function determined by an anchor master of the NAN cluster.

Another aspect of this disclosure provides an apparatus for wireless communication. The apparatus may include means for determining parameters for indicating an availability of a multi-hop service associated with an NDL and means for broadcasting an information attribute that includes the determined parameters during a discovery window of a NAN network.

Another aspect of this disclosure provides an apparatus for wireless communication. The apparatus may include a memory and at least one processor coupled to the memory. The at least one processor may be configured to determine parameters for indicating an availability of a multi-hop service associated with an NDL and to broadcast an information attribute that includes the determined parameters during a discovery window of a NAN network.

Another aspect of this disclosure provides a computer-readable medium of a first wireless device storing computer executable code. The computer-readable medium may include code to determine parameters for indicating an availability of a multi-hop service associated with an NDL and to broadcast an information attribute that includes the determined parameters during a discovery window of a NAN network.

Another aspect of this disclosure provides an apparatus (e.g., a station) for wireless communication. The apparatus is configured to determine a data scheduling protocol for a multi-hop service and to communicate with one or more wireless devices based on the determined data scheduling protocol.

In another aspect, a method of wireless communication by a wireless device is provided. The method may include determining a data scheduling protocol for a multi-hop service and communicating with one or more wireless devices based on the determined data scheduling protocol. In an aspect, the multi-hop service is a NAN multi-hop service. In another aspect, the wireless device is a member of a NAN cluster and shares a common set of NAN parameters with all other members of the NAN cluster associated with the multi-hop service. In another aspect, the wireless device is time synchronized with all the other members of the NAN cluster based on a timing synchronization function determined by an anchor master of the NAN cluster. In another aspect, the determining the data scheduling protocol may include determining an NDL schedule and determining to exchange request to send (RTS) and clear to send (CTS) messages before communicating with the one or more wireless devices according to the determined NDL schedule. In another aspect, the determining the data scheduling protocol may include determining that the wireless device has a scheduler role, selecting a per link scheduling allocation or a per hop scheduling allocation based on the determination that the wireless device has the scheduler role, and performing a per link scheduling algorithm or a per hop scheduling algorithm based on the selection. In another configuration, the method may further include receiving a message from a parent wireless device indicating that the scheduler role is assigned to the wireless device from the parent wireless device. In another aspect, the performing the per link scheduling algorithm may include determining a local network degree associated with the wireless device, determining a number of base time blocks for communication based on the determined local network degree, and determining a local schedule associated with the wireless device for communicating with the one or more wireless devices based on the determined number of base time blocks. In another configuration, the method may include receiving schedules associated with one-hop and two-hop neighbor wireless devices and a sequence number associated with each of the schedules. The local schedule may be further determined based on the received schedules associated with the one-hop or the two-hop neighbor wireless devices if the schedules and the local schedule have the same sequence number. In another configuration, the method may include broadcasting a message that includes the determined local schedule, a sequence number associated with the determined local schedule, and one-hop neighbor schedules associated with the same sequence number. In another aspect, the message is a group-addressed message. In another aspect, the message is encrypted using a common group key when the multi-hop service is based on secure communications. In another aspect, the message includes an indication of a next wireless device assigned the scheduler role. In this aspect, the method may further include receiving an acknowledgment of the scheduler role from the next wireless device. In another configuration, the method may further include transmitting a unicast message to a next wireless device indicating that the scheduler role is assigned to the next wireless device and receiving an acknowledgment of the scheduler role from the next wireless device based on the transmitted unicast message. In another aspect, the performing the per link scheduling algorithm may further include determining a network degree for a plurality of child wireless devices associated with the wireless device and assigning, based on the determined network degree for each child wireless device, the scheduler role to a child wireless device of the plurality of child wireless devices that has a respective network degree greater than one and that has not been assigned the scheduler role. In another aspect, the performing the per link scheduling algorithm may further include receiving an assignment of the scheduler role back from the child wireless device and performing one of assigning the scheduler role to another child wireless device of the plurality of child wireless devices that has a next highest network degree greater than one, and that has not been assigned the scheduler role, returning the scheduler role to a parent wireless device associated with the wireless device when all child wireless devices have been considered for assignment of the scheduler role, or ending the per link scheduling algorithm when all child wireless devices have been considered for assignment of the scheduler role and if the wireless device initiated the per link scheduling algorithm. In another aspect, the performing the per hop scheduling algorithm may include determining a local schedule associated with the wireless device for communicating with other wireless devices. In another configuration, the method may further include receiving schedules associated with one-hop and two-hop neighbor wireless devices and a sequence number associated with each of the schedules. In this configuration, the local schedule is further determined based on the received schedules associated with the one-hop or the two-hop neighbor wireless devices if the schedules and the local schedule have the same sequence number. In another configuration, the method may include broadcasting a message that includes the determined local schedule, a sequence number associated with the determined local schedule, and one-hop neighbor schedules associated with the same sequence number. In another aspect, the message is a group-addressed message. In another aspect, the message is encrypted using a common group key when the multi-hop service is based on secure communications. In another aspect, the message includes an indication of a next wireless device assigned the scheduler role. In this aspect, the method may further include receiving an acknowledgment of the scheduler role from the next wireless device. In another configuration, the method may further include transmitting a unicast message to a next wireless device indicating that the scheduler role is assigned to the next wireless device and receiving an acknowledgment of the scheduler role from the next wireless device based on the transmitted unicast message. In another aspect, the performing the per hop scheduling algorithm may further include determining a network degree for a plurality of child wireless devices associated with the wireless device and assigning, based on the determined network degree for each child wireless device, the scheduler role to a child wireless device of the plurality of child wireless devices that has a respective network degree greater than one and that has not been assigned the scheduler role. In another aspect, the performing the per hop scheduling algorithm may further include receiving an assignment of the scheduler role back from the child wireless device and performing one of assigning the scheduler role to another child wireless device of the plurality of child wireless devices that has a next highest network degree greater than one, and that has not been assigned the scheduler role, returning the scheduler role to a parent wireless device associated with the wireless device when all child wireless devices have been considered for assignment of the scheduler role, or ending the per hop scheduling algorithm when all child wireless devices have been considered for assignment of the scheduler role and if the wireless device initiated the per hop scheduling algorithm. In another aspect, the determining the data scheduling protocol may further include selecting a per link scheduling allocation or a per hop scheduling allocation, determining, based on the selection, a local schedule associated with the wireless device for communicating with the one or more wireless devices, and broadcasting the determined local schedule. In another aspect, the determined local schedule is encrypted based on a common group key. In another configuration, the method may further include receiving a broadcasted schedule from a parent wireless device, and the local schedule is determined based on the broadcasted schedule from the parent wireless device. In another aspect, the broadcasted schedule is encrypted based on a common group key. In another configuration, the method may further include detecting that a communication throughput, based on the determined local schedule, is below a threshold and updating the local schedule based on the detection.

Another aspect of this disclosure provides an apparatus for wireless communication. The apparatus may include means for determining a data scheduling protocol for a multi-hop service and means for communicating with one or more wireless devices based on the determined data scheduling protocol.

Another aspect of this disclosure provides an apparatus for wireless communication. The apparatus may include a memory and at least one processor coupled to the memory. The at least one processor may be configured to determine a data scheduling protocol for a multi-hop service and to communicate with one or more wireless devices based on the determined data scheduling protocol.

Another aspect of this disclosure provides a computer-readable medium of a wireless device storing computer executable code. The computer-readable medium may include code to determine a data scheduling protocol for a multi-hop service and to communicate with one or more wireless devices based on the determined data scheduling protocol.

BRIEF DESCRIPTION OF THE DRAWINGS

FIGS. 4A and 4B illustrate an exemplary service descriptor attribute and an exemplary multi-hop attribute.

FIG. 5 illustrates an exemplary NDL attribute.

DETAILED DESCRIPTION

Figure 1:
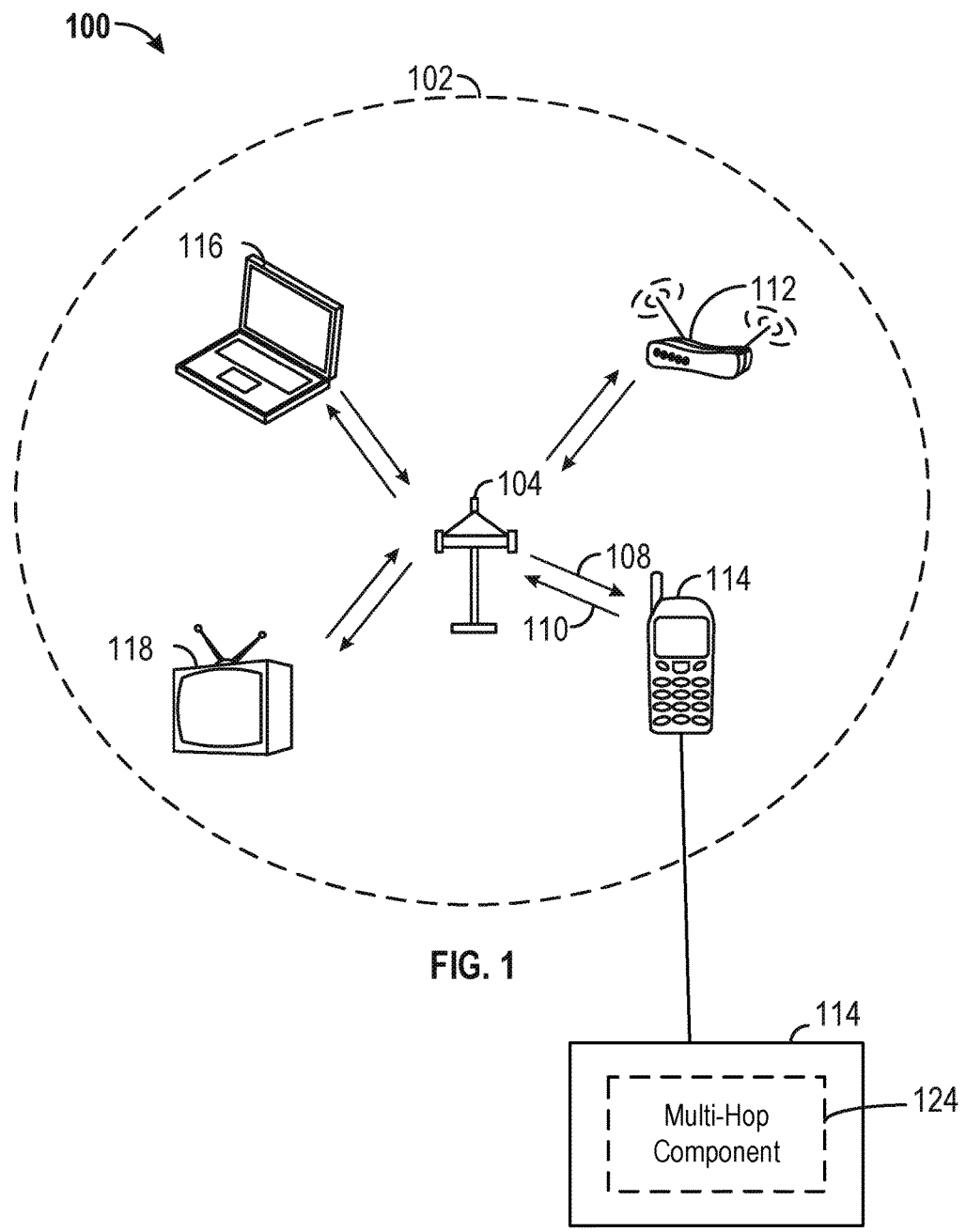
FIG. 1 shows an example wireless communication system in which aspects of the present disclosure may be employed.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method, which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices, which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system.

Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, either from the beacon or probe response frames, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the STA 114 may include one or more components for performing various functions. For example, the STA 114 may include a multi-hop component 124 to perform procedures related to multi-hop communications. In one configuration, the multi-hop component 124 may be configured to determine that a multi-hop feature is enabled for a service and to transmit, based on the determination, a multi-hop attribute that includes an identifier provided by a publisher device and a hop count associated with the service.

In another configuration, the multi-hop component 124 may be configured to receive an information attribute from a second wireless device (e.g., STA 112) that indicates a multi-hop service is available from a publisher device (e.g., STA 116) and that includes an identifier identifying the publisher device of the multi-hop service. The multi-hop component 124 may be configured to determine to subscribe to the multi-hop service based on the received information attribute.

In another configuration, the multi-hop component 124 may be configured to determine parameters for indicating an availability of a multi-hop service associated with an NDL. The multi-hop component 124 may be configured to broadcast an information attribute that includes the determined parameters during a discovery window of a NAN.

In another configuration, the multi-hop component 124 may be configured to determine a data scheduling protocol for a multi-hop service and to communicate with one or more wireless devices based on the determined data scheduling protocol.

NAN discovery windows may be used to enable wireless devices within the NAN to discovery other wireless devices.

Figure 2A:
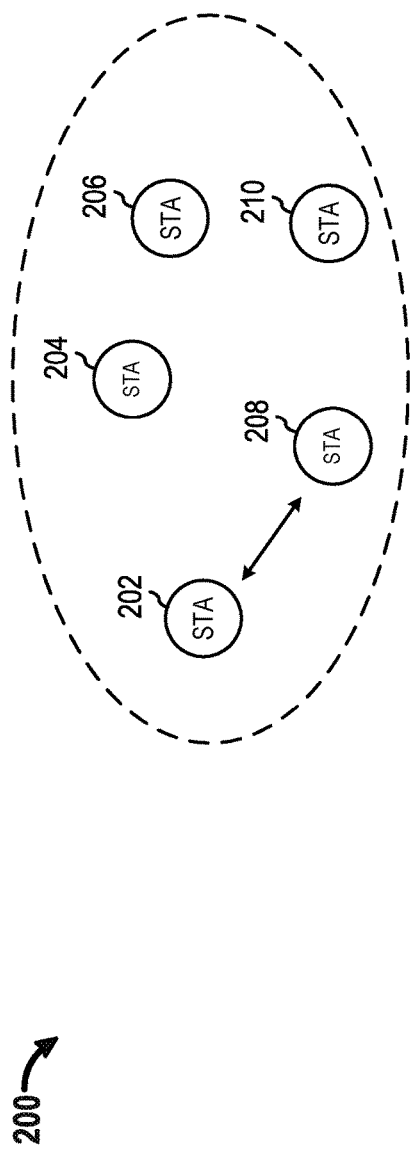
FIG. 2A is an exemplary diagram of a NAN cluster.

FIG. 2A is an exemplary diagram 200 of a NAN cluster. The NAN cluster may include multiple wireless devices, such as STAs 202, 204, 206, 208, 210. Each wireless device may communicate with another wireless device via a device-to-device (D2D) connection. For example, the STA 202 may communicate with the STA 208 via a D2D connection. In an aspect, all of the STAs 202, 204, 206, 208, 210 participating in the NAN cluster may be synchronized to the same NAN clock. The NAN clock may be determined by the STA 202, for example, acting in the master role of the NAN cluster. In an aspect, the STA 202 may determine the timing synchronization function (TSF) and broadcast the TSF in the NAN synchronization beacon. Other STAs may adopt the TSF and broadcast the TSF to other devices within the NAN.

Figure 2B:
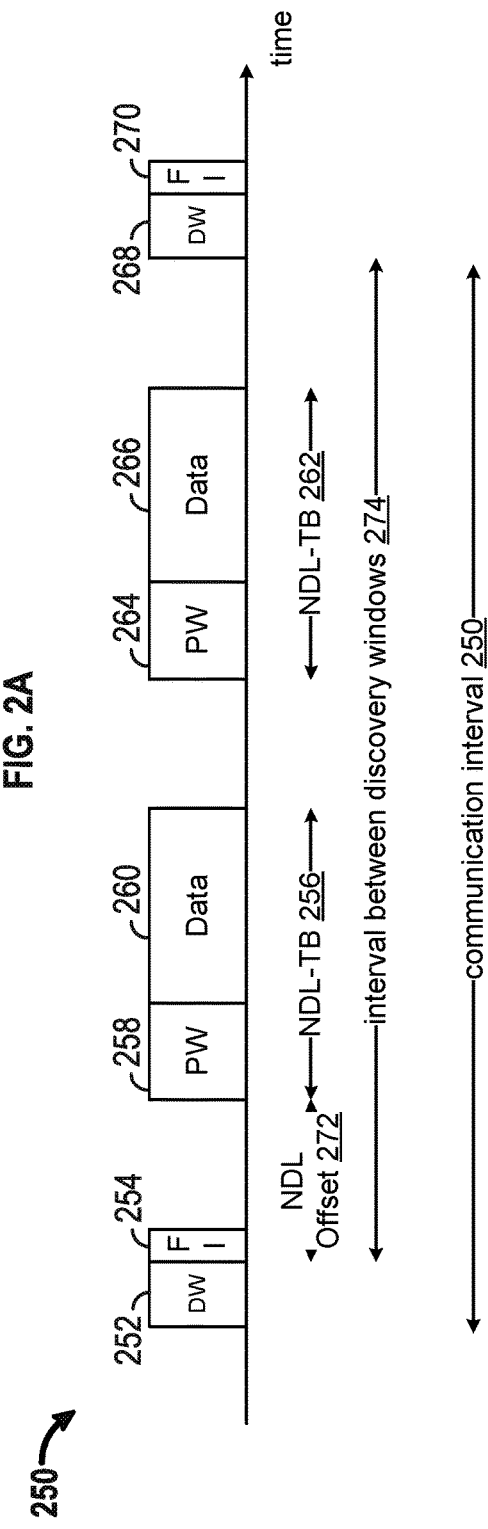
FIG. 2B is an exemplary diagram of a communication interval in a NAN.

FIG. 2B is an exemplary diagram of a communication interval 250 in a NAN. The communication interval 250 may include one or more discovery windows 252, 268 (e.g., NAN service discovery windows), which may be time windows designated for and dedicated for enabling wireless devices (e.g., a STA) within a NAN to discover other peer wireless devices. That is, during the discovery window 252, for example, wireless devices in the NAN may transmit peer discovery signals for peer discovery. The time interval between two discovery windows may be 512 time units (e.g., 512 ms) (e.g., an interval between discovery windows 274). The communication interval 250 may include fixed intervals 254, 270 (which may also be known as connection setup windows or further service discovery windows), which may be allocated for connection setup. For example, after wireless devices discover each other during the discovery window 252, the wireless devices may utilize the fixed interval 254 after the discovery window 252 to transmit signaling for a connection setup (e.g., a D2D connection setup). In one aspect, the fixed interval 254 may immediately follow the discovery window 252 and may be dedicated for connection setup. In another aspect, the fixed interval 254 may follow the discovery window 252, but need not immediately follow the discovery window 252.

In an aspect, wireless devices may perform connection setup during the fixed intervals 254, 270. Wireless devices that publish/subscribe to a service may remain awake after the discovery windows 252, 268 to exchange connection setup messages in the fixed intervals 254, 270. In another aspect, wireless devices may perform connection setup during a NAN data link time block (DL-TB) (or another type of DL-TB) in addition to during the fixed intervals 254, 270. As shown in FIG. 2B, the communication interval 250 includes a first NDL time block (NDL-TB) 256 and a second NDL-TB 262. The first NDL-TB 256 may be offset from the end or beginning of the discovery window 252 by an NDL offset value 272. The first NDL-TB 256 may include a first paging window 258 and a first data window 260. The first paging window 258 may be used by a first wireless device for paging a second wireless device to indicate that the first wireless device has data to transmit to the second wireless device (e.g., data related to a photo sharing service). Subsequently, the first wireless device may transmit the data in the first data window 260 used for transmitting data associated with destinations/wireless devices identified during the first paging window 258. Similarly, the second NDL-TB 262 may include a second paging window 264 and a second data window 266. In another aspect, if the second wireless device is not paged during a paging window (e.g., no data is expected for the second wireless device), then the second wireless device may enter a sleep or doze state.

In an aspect, a third wireless device may have discovered the first wireless device during a previous discovery window and may be aware that the first wireless device is providing a service (e.g., photo sharing service). Subsequently, the third wireless device may want to establish a connection with the first wireless device to receive the service, but the fixed interval 254 may already have passed. In this aspect, the third wireless device may utilize the first paging window 258 for connection setup.

NAN network provides a mechanism for wireless devices to synchronize time and channel(s) on which the wireless devices may converge to facilitate the discovery of NAN services that have been made discoverable on existing or new devices that enter the NAN. In an aspect, the service discovery may occur without the assistance of an AP. A NAN network may operate in one channel in the 2.4 gigahertz (GHz) frequency band, and/or optionally, in one channel in the 5 GHz frequency band. The NAN channel in the 2.4 GHz frequency band may be channel 6 (2.327 GHz).

A NAN cluster may include multiple wireless devices or NAN devices, such as STAs 112, 114, 116, 118. The NAN cluster may be a collection of NAN devices that share a common set of NAN parameters. NAN parameters may include a time period between consecutive discovery windows, the time duration of the discovery windows, and a beacon interval. In an aspect, all of the STAs 112, 114, 116, 118 participating in the NAN cluster may be synchronized to the same NAN clock, which may be determined by the STA 112, for example, if the STA 112 is acting in the anchor master role of the NAN cluster. The STA 112, as the anchor master, may determine the TSF and broadcast the TSF in the NAN synchronization beacon. Other STAs in the NAN cluster may be required to adopt the TSF and to broadcast the TSF to other devices within the NAN. The NAN synchronization beacon may be broadcasted by NAN devices during the discovery window. NAN devices that receive the NAN synchronization beacon may use the beacon for clock synchronization.

During connection setup, STAs may establish a schedule for communications, which may be known as an NDL. In one aspect, the schedule may be negotiated between two STAs. In another aspect, the schedule may be determined by the service provider and be non-negotiable. In another aspect, there may be only one NDL between two STAs, but one NDL may support multiple NAN data paths (NDPs) between the two STAs. Each NDP may be associated with a different service (e.g., a multi-hop service). The services that are part of the NDL may be multi-hop services and/or non-multi-hop services (e.g., single-hop service). In an aspect, each NDP may have its own quality of service and/or security requirements. In another aspect, each NDP may have its own interface. As between the two STAs, all of the NDPs between the two STAs may conform to the same schedule, which may be the NDL schedule between the two STAs.

Current NAN and NDL design is limited to 1-hop communications. For example, referring to FIG. 2A, the STA 202 may communicate with the STAs 204, 208 if the STAs 204, 208 are 1-hop from the STA 202. However, the STA 202 may not be able to communicate with the STA 206 via the STAs 204, 208. Because of the 1-hop limitation, Wi-Fi range may be limited. For example, Wi-Fi range in indoor environments may be limited to 50 feet. Multi-hop communications for NAN is needed to increase Wi-Fi range in indoor environments. Increased Wi-Fi range reduces the restrictions on the range and scope of applications. For example, applications for multi-user gaming services, content sharing services, and coupon services may benefit from having an increased communication range, which increases the number of users who can participate in the different services. Multi-hop topologies, however, may suffer from a hidden node problem, which could result in interference between transmissions from 2-hop neighbors. For example, assume the STA 202 has data to transmit to the STA 208, and the STA 210 has data to transmit to the STA 208. The STA 202, however, is not aware of the STA 208, and vice versa. The STAs 202, 210 may transmit to the STA 208 simultaneously, which interference with the STA 208's ability to receive both transmissions. Accordingly, to support multi-hop topology, a coordination transmission is needed to help each wireless device receive a fair share of bandwidth without interfering with the transmissions of neighboring wireless devices. A signaling mechanism is also needed to support multi-hop topologies by advertising the availability of multi-hop services.

In an aspect, the NDL multi-hop protocol may not require device beaconing for purposes of indicating there is traffic data (e.g., a traffic indication map) for transmission because the NDL devices are already time synchronized. By avoiding beaconing, beacon collision avoidance mechanisms are not required and signaling overhead is reduced. Further, because NDL devices are not required to beacon, NDL devices may have greater power save because the NDL devices need not keep track of or stay awake for each of the other neighboring devices' beacon times. Instead, all NDL devices may wake up during a coordinated paging window period, determine if there is traffic for the NDL device, and go to sleep if there is no traffic.

Figure 3:
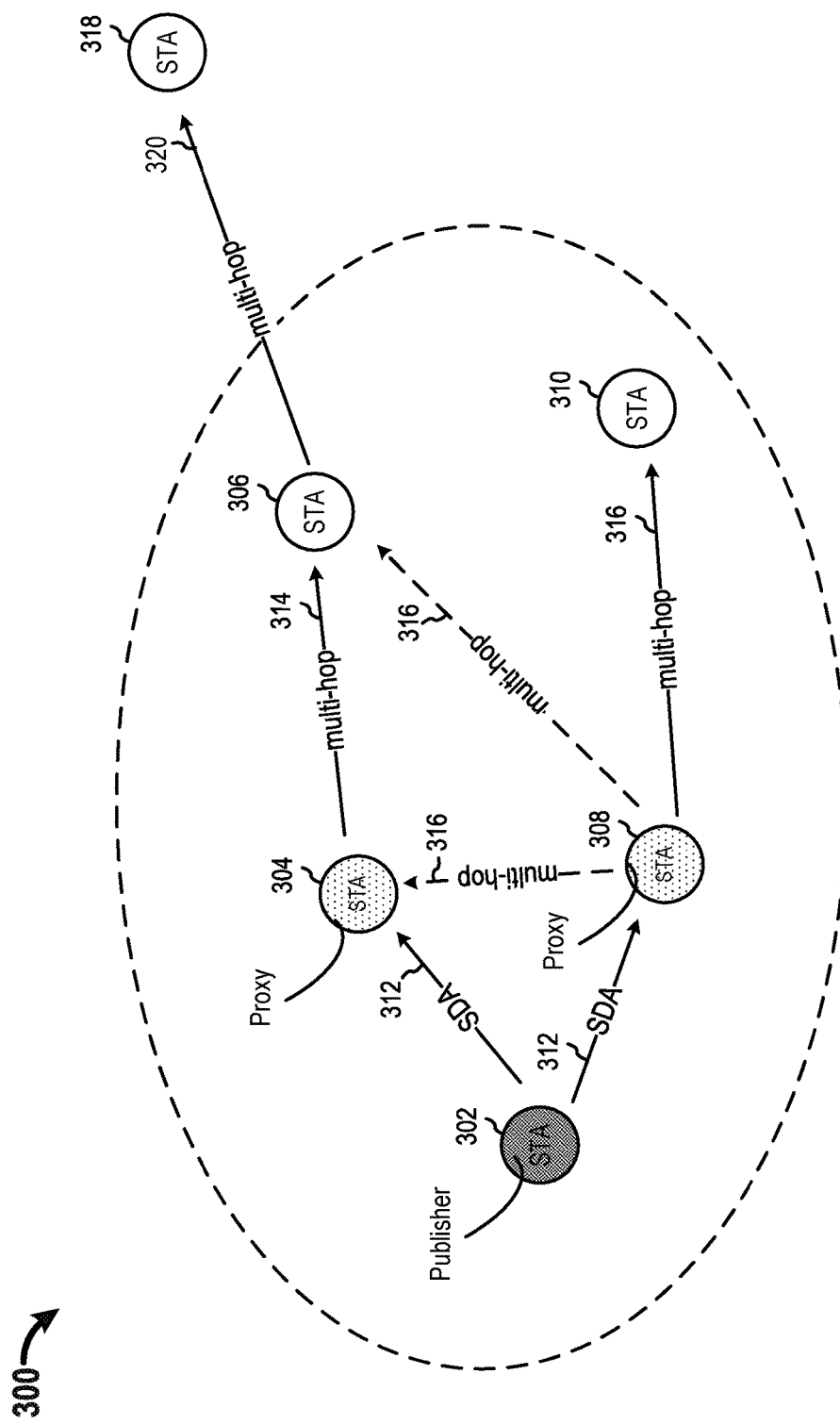
FIG. 3 illustrates a diagram of a multi-hop topology.

FIG. 3 illustrates a diagram 300 of a multi-hop topology. Referring to FIG. 3, the STAs 302, 304, 306, 308, 310 may be members of a NAN data cluster. Members of the same NAN data cluster may be time synchronized based on a NAN synchronization mechanism (e.g., a NAN synchronization beacon). The STA 302 may be the publisher of an available multi-hop service (e.g., a gaming service). The publisher of a service may be a device that initiates the service, determines control information related to the service, and provides the service to other devices. In an aspect, the STA 302 may determine to advertise the multi-hop service to other STAs. The STA 302 may determine parameters for indicating the availability of the multi-hop service. For example, the STA 302 may determine a maximum hop count (e.g., 3 hops) associated with the multi-hop service, determine an indicator that identifies the multi-hop service as multi-hop capable, and determine an identifier (e.g., a medium access control (MAC) address) that identifies the STA 302 as the publisher for the multi-hop service. The maximum hop count may be a hop count from the STA 302 to another wireless device receiving the multi-hop service. To advertise the multi-hop service, the STA 302 may transmit (e.g., broadcast) a service descriptor attribute (SDA) 312 that includes one or more of the determined parameters to indicate that the service available from the STA 302. In an aspect, the SDA 312 may be transmitted within a service discovery frame. The STAs 304, 308 may receive the SDA 312 because they are 1-hop away from the STA 302. However, the STAs 306, 310 may not receive the SDA 312 because they are 2-hops away from the STA 302.

Multi-Hop Service Discovery

To expand the range of the multi-hop service, the STAs 304, 308 may serve as a proxy for the STA 302. Upon receiving the SDA 312, the STAs 304, 308 may rebroadcast a portion or all of the SDA 312 via a multi-hop attribute. For example, the STAs 304, 308 may transmit (e.g., broadcast) first and second multi-hop attributes 314, 316 to proxy the STAs 302's SDA 312. In this example, upon receiving the SDA 312, the STA 304 may determine that a service is available at the STA 302 and that the service supports multi-hop. In one aspect, the SDA 312 may indicate that service needs to be proxied. For example, the SDA 312 may include a bit indicator indicating whether the advertised service supports multi-hop. In this aspect, if the bit indicator is set to 1, then the service supports multi-hop and should be proxied, but if the bit indicator is set to 0, then the service does not support multi-hop and should not be proxied. As such, a STA that receives the SDA 312 may know whether to proxy the service based on the indicator. In another aspect, the SDA 312 may not include an indicator of whether the advertised service supports multi-hop. Instead, STAs may be preconfigured with information indicating that certain categories of services (e.g., multi-user gaming) support multi-hop. In this aspect, the STAs may include a database of services known to support multi-hop. By utilizing proxy STAs (e.g., the STAs 304, 308), other STAs in the neighborhood may receive service announcements from a greater number of STAs (e.g., a STA publishing the service and STAs proxying the service). In an aspect, the STAs 304, 308 may transmit an NDL attribute with the respective first and second multi-hop attributes 314, 316. For example, the STA 304 may transmit both the first multi-hop attribute 314 and an NDL attribute in the service discovery frame. The NDL attribute may include a schedule (e.g., a schedule of wake times) of the data link associated with the multi-hop service. The schedule may be determined the publisher of the service and may not be negotiable. In another aspect, the first and second multi-hop attributes 314, 316 may be transmitted in the SDF during the discovery window 252 of a NAN with which the STAs 302, 304, 306, 308, 310 are all associated.

The STAs 306, 310 may receive the first and second multi-hop attributes 314, 316, respectively. The STAs 306, 310 may determine to join the multi-hop service by determining that the service is a multi-hop service (e.g., based on the first and second multi-hop attributes 314, 316) and by determining that the STAs 306, 310 are within a hop count (e.g., a maximum hop count) indicated in the first and second multi-hop attributes 314, 316. Subsequently, the STAs 306, 310 may join the multi-hop service by transmitting a request to join the NDL to the STAs 304, 308, respectively. The request to join the NDL may be an association request or another type of request. After transmitting the request, and during association, the STA 304, for example, may authenticate the STA 306. The STAs 304, 306 may each generate pairwise keys for secure D2D communication between the STA 304 and the STA 306. Once the STA 306 is associated with the STA 304, and thus joined the NDL for the multi-hop service, the STA 306 is able to authorize other STAs (e.g., a STA 318) to join the NDL for the multi-hop service. After being authenticated, the STA 306 may receive a common group key (CGK) from the STA 304. After receiving the CGK, the STA 306 may be considered a member of the NDL, and the STA 306 may be able to authenticate other devices for purposes of joining the NDL. The CGK may be a network group key used for group communications associated with the multi-hop service and the NDL group. When group communications associated with the multi-hop service are required to be secure, all of the group communications may be encrypted using the CGK, and therefore, may be decrypted by devices with the CGK. In other words, the CGK supports the concept of single authentication group authorization. That is, when the STA 306 is authenticated by a single device (e.g., the STA 304) associated with the NDL, then the STA 306 is authorized to transmit group communications in the NDL and receive and decrypt group communications from any other devices associated with the NDL group. For example, the STA 306 may decrypt secure group communications from the STAs 304, 308. Thus, once the STA 306 has the CGK, the STA 306 does not need to associate with other devices in the NDL in order to transmit or receive group-addressed traffic. This is different from the scenario in which each device has its own unique group key, and receiving devices must have the group key unique to the transmitting device, obtained during association, in order to decode the transmissions. In another aspect, instead of encrypting group communications using a CGK, a STA may transmit group communications with a group-address. Group-addressed traffic may be decrypted by any device. However, devices not associated with the NDL may determine not to decode group-addressed traffic directed to the NDL group. In contrast to a CGK, a pairwise key may be used by STAs to transmit data from one STA to another STA via an intermediate STA. For example, the STA 302 may transmit data to the STA 306 via the STA 304. The STA 302 may use the pairwise key between the STA 302, 304 to transmit the data securely to the STA 304. The STA 304 may use the pairwise key between the STAs 304, 306 to transmit the data securely to the STA 306. In sum, multicast traffic may be encrypted using the CGK, and unicast traffic may be encrypted using the pairwise key. In some instances, unicast traffic may be encrypted using the CGK instead of the pairwise key.

In another aspect, after the STA 306 associates with the STA 304, the STA 304 may assign an association identifier (AID) to the STA 306, and vice versa. In some instances, the AIDs may be selected from a local pool of AIDs. The AIDs may be used as identifiers in traffic indication maps transmitted during paging windows to indicate whether traffic is expected for a STA. For example, the STA 304 may transmit a traffic indication map that includes a bit set to 1 corresponding to the AID of the STA 306 to indicate that the STA 304 has data for the STA 306.

After the STA 306 joins the multi-hop service, the STA 306 may also serve as a proxy for the multi-hop service. In aspect, assuming the maximum hop count from the STA 302 is 3, and the current hop count is 2 (from the STA 306 to the STA 302), the STA 306 may determine to proxy the multi-hop service. The STA 306 may transmit a third multi-hop attribute 320 in a service discovery frame that also includes the NDL attribute associated with the multi-hop service. The third multi-hop attribute 320 may be received by the STA 318. The STA 318 may determine to subscribe to the multi-hop service indicated in the received third multi-hop attribute 320. In an aspect, the STA 318 may join the multi-hop service by using the NDL attribute in the service discovery frame. The STA 318 may transmit an association request or a request to join the NDL to the STA 306. The request to join the NDL may be the same as an association request or may be a different request. The STA 306 may authenticate the STA 318, and both the STAs 306, 318 may generate a pairwise key for secure communications between the STAs 306, 318. The STA 306 may transmit the CGK to the STA 318 for secure communications over the NDL. In an aspect, the because the maximum hop count for the multi-hop service is 3, and the hop count from the STA 318 to the STA 302 is 3, the STA 318 may determine to refrain from transmitting another multi-hop attribute to proxy the multi-hop service.

In an aspect, devices may filter duplicate attributes associated with the same multi-hop service so as not to retransmit an excessive amount of multi-hop attributes. For example, the STA 304 may receive the SDA 312 from the STA 302 and the second multi-hop attribute 316 from the STA 308. However, instead of transmitting a separate multi-hop attribute for both of the SDA 312 and the second multi-hop attribute 316, the STA 304 may determine that the SDA 312 and the second multi-hop attribute 316 are announcing the same multi-hop service (e.g., based on a service ID and/or publisher ID) and only transmit a single multi-hop attribute in response. The STA 304 may determine the best path (e.g., shortest path or path with best link quality) to the publisher based on the received attributes, which is 1-hop based on the SDA 312 and 2-hops based on the second multi-hop attribute 316. The STA 304 may transmit the first multi-hop attribute 314 based on the hop count of the determined best path. For example, instead of indicating a hop count of 2 based on the second multi-hop attribute 316, then STA 304 may indicate a hop count of 1.

In another aspect, if the STA 304 transmitted the first multi-hop attribute 314 before receiving the second multi-hop attribute 316, the STA 304 may refrain from proxying the second multi-hop attribute 316 because the multi-hop service has already be proxied.

Similarly, the STA 306 may receive both the first and the second multi-hop attributes 314, 316. Instead of transmitting a separate multi-hop attribute in response to each of the first and the second multi-hop attributes 314, 316, the STA 306 may filter the first and second attributes 314, 316 (e.g., determine that both attributes are associated with the same multi-hop service), determine the best path to the STA 302 (e.g., in this case, 2-hops), and transmit the third multi-hop attribute 320 for both the first and second multi-hop attributes 314, 316.

Figure 10:
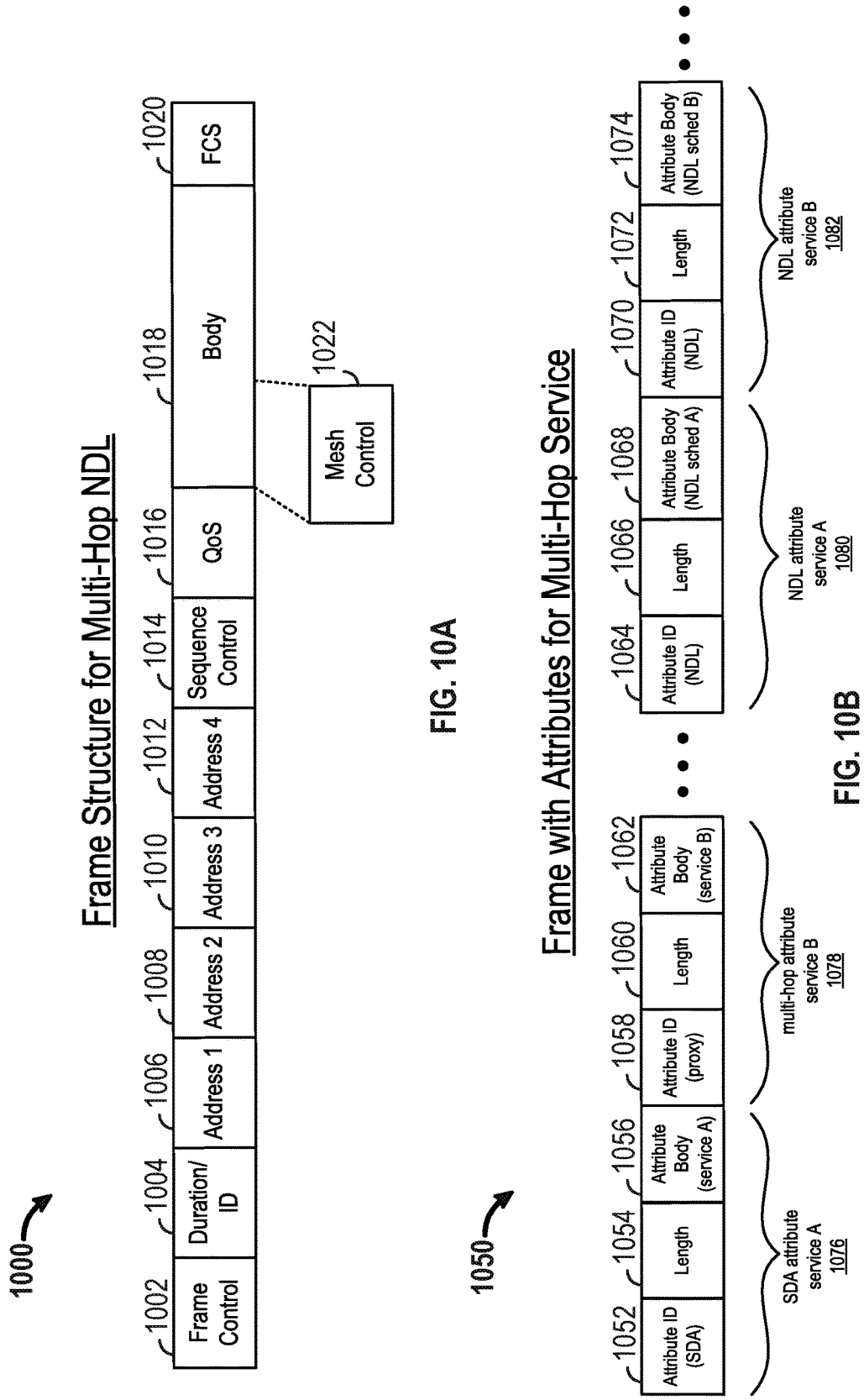
FIG. 10A illustrates an exemplary data and/or control frame for multi-hop topologies.
FIG. 10B illustrates an exemplary diagram of a service discovery frame.

In an aspect, the SDAs and MHAs transmitted in FIG. 3 may include one or more fields as described below in FIGS. 4A (for SDA) and 4B (for MHA). The attributes may be transmitted in frames as described in further below in FIGS. 10A and 10B.

FIGS. 4A and 4B illustrate an exemplary service descriptor attribute 400 and an exemplary multi-hop attribute 450. Referring to FIG. 4A, the service descriptor attribute 400 may be transmitted by a publisher of a service to announce the availability of the service. The service descriptor attribute 400 may include attribute ID, length, service ID, instance ID, requestor instance ID, service control, binding bitmap, service info length, and service info fields. The attribute ID may be 1 octet in size and may have a value of 0x03. The attribute ID may identify the attribute as a service descriptor attribute, as opposed to other NAN attributes. The length field (e.g., 2 octets in size) may indicate the length of the following fields in the service descriptor attribute 400. The service ID field (e.g., 6 octets in size) may include a hash of the service name associated with the service descriptor attribute 400. The instance ID (e.g., 1 octet in size) may identify an instance of the service. For example, if the service is video streaming, the instance ID may indicate whether the instance of the service is hi-definition, low-definition, or standard definition video streaming. The requestor instance ID (e.g., 1 octet in size and 0x00 in value) may indicate a transaction ID associated with the service descriptor attribute 400. The service control field (e.g., 1 octet in size and 0x0 A in value) may indicate that the service descriptor attribute 400 includes the binding bitmap field and the service info field. The binding bitmap field (e.g., 2 octets in size) may be a bitmap that points to the NDL attribute. For example, if the service descriptor attribute 400 is transmitted in a service discovery frame with multiples attributes, the first of which is the service descriptor attribute 400 and the third of which is the NDL attribute, the binding bitmap may point to the NDL attribute based on a position of the bit. For example if, there are four attributes, the bitmap may indicate 0010 to indicate that the third attribute is the NDL attribute associated with the service descriptor attribute 400. The service info length field (e.g., 1 octet in size) may indicate the length of the service info field. The service info field, which may be of variable size, may include the MAC address of the publisher device associated with the service. In an aspect, the service info field may indicate that the service supports multi-hop and that the service descriptor attribute 400 should be proxied. In another aspect, the service info field may indicate how far a multi-hop service should be proxied. In this aspect, the service info field may include a maximum hop count from the publisher device for which the multi-hop service may be provided.

Referring to FIG. 4B, the multi-hop attribute 450 may be transmitted by a device proxying for the publisher of a service. The multi-hop attribute 450 may be used by the proxying device to announce the availability of the service to devices more than 1-hop from the publisher. The multi-hop attribute 450 may include attribute ID, length, service ID, instance ID, requestor instance ID, service control, binding bitmap, service info length, and service info fields. The attribute ID may be 1 octet in size and may have a value of 0x0 F. The attribute ID may identify the attribute as a multi-hop attribute for proxying a service, as opposed to other NAN attributes. The length field (e.g., 2 octets in size) may indicate the length of the following fields in the multi-hop attribute 450. The service ID field (e.g., 6 octets in size) may include a hash of the service name associated with the multi-hop attribute 450. The instance ID (e.g., 1 octet in size) may identify an instance of the service. For example, if the service is video streaming, the instance ID may indicate whether the instance of the service is hi-definition, low-definition, or standard definition video streaming. The requestor instance ID (e.g., 1 octet in size and 0x00 in value) may indicate a transaction ID associated with the multi-hop attribute 450. The service control field (e.g., 1 octet in size and 0x0 A in value) may indicate that the multi-hop attribute 450 includes the binding bitmap field and the service info field. The binding bitmap field (e.g., 2 octets in size) may be a bitmap that points to the NDL attribute for the proxied service (e.g., not a service provided by the device proxying the service). For example, if the multi-hop attribute 450 is transmitted in a service discovery frame with multiples attributes, the second of which is the multi-hop attribute 450 and the third of which is the NDL attribute, the binding bitmap may point to the NDL attribute based on a position of the bit. For example if, there are four attributes, the bitmap may indicate 0010 to indicate that the third attribute is the NDL attribute associated with the multi-hop attribute 450. By contrast, if the NDL attribute was the fourth attribute in the service discovery frame, then the bitmap my indicate 0001. The service info length field (e.g., 1 octet in size) may indicate the length of the service info field. The service info field, which may be of variable size, may include the MAC address of the publisher device associated with the service. In an aspect, the service info field may indicate a maximum hop count from the publisher device for which the service may be provided and a current hop count from the publisher device. The difference of the maximum hop count and the current hop count may indicate a number of additional hops that that multi-hop service is available. In another aspect, instead of indicating a maximum hop count and a current hop count, the service info field may indicate a remaining hop count (e.g., the maximum hop count minus the current hop count). When the remaining hop count is 0 or when the current hop count is equal to the maximum hop count, a proxying device will not transmit the multi-hop attribute 450. In another aspect, the multi-hop attribute need not be an attribute with multiple fields. In this aspect, the multi-hop attribute may be a field within an attribute or an element within a frame that indicates the service associated with it is a multi-hop service or that indicates that the data link associated with the multi-hop attribute is a multi-hop NDL. In this aspect, the multi-hop attribute may include at least one of an identifier identifying the service (or the NDL) and/or a hop count associated with the service (or the NDL).

FIG. 5 illustrates an exemplary NDL attribute 500. The NDL attribute 500 may be used to indicate an availability of a data link, indicate a schedule associated with the data link, and indicate control information associated with the data link. For example, the control information may indicate whether the data link may be changed and the quality of service requirements associated with the data link. Referring to FIG. 5, the NDL attribute 500 may include attribute ID, length, NDL control, NDC ID, NDL ID, immutable schedule tag, QoS tag, map ID, time bitmap control, and time bitmap fields. The attribute ID may indicate a type of NAN attribute (e.g., a NDL attribute). The length field may indicate the length of the NDL attribute 500 following the length field. The NDL control field may be the control field for the NDL attribute. The NDC ID field may identify a NAN data cluster to which the NDL attribute is associated. The NDL ID may identify the NAN data link. The immutable schedule tag my point to an immutable schedule attribute that may include an immutable schedule for the NDL. The QoS tag may point to a QoS attribute that indicates the QoS requirements for the NDL. The map ID may point to an availability attribute associated with the NDL. In an aspect, the availability attribute may indicate a STA's potential, proposed, and/or committed time and channel availability. The time bitmap control field may indicate the parameters associated with the time bitmap field, and the time bitmap field may include a base schedule for the NDL.

Multi-Hop Routing

Figure 6:
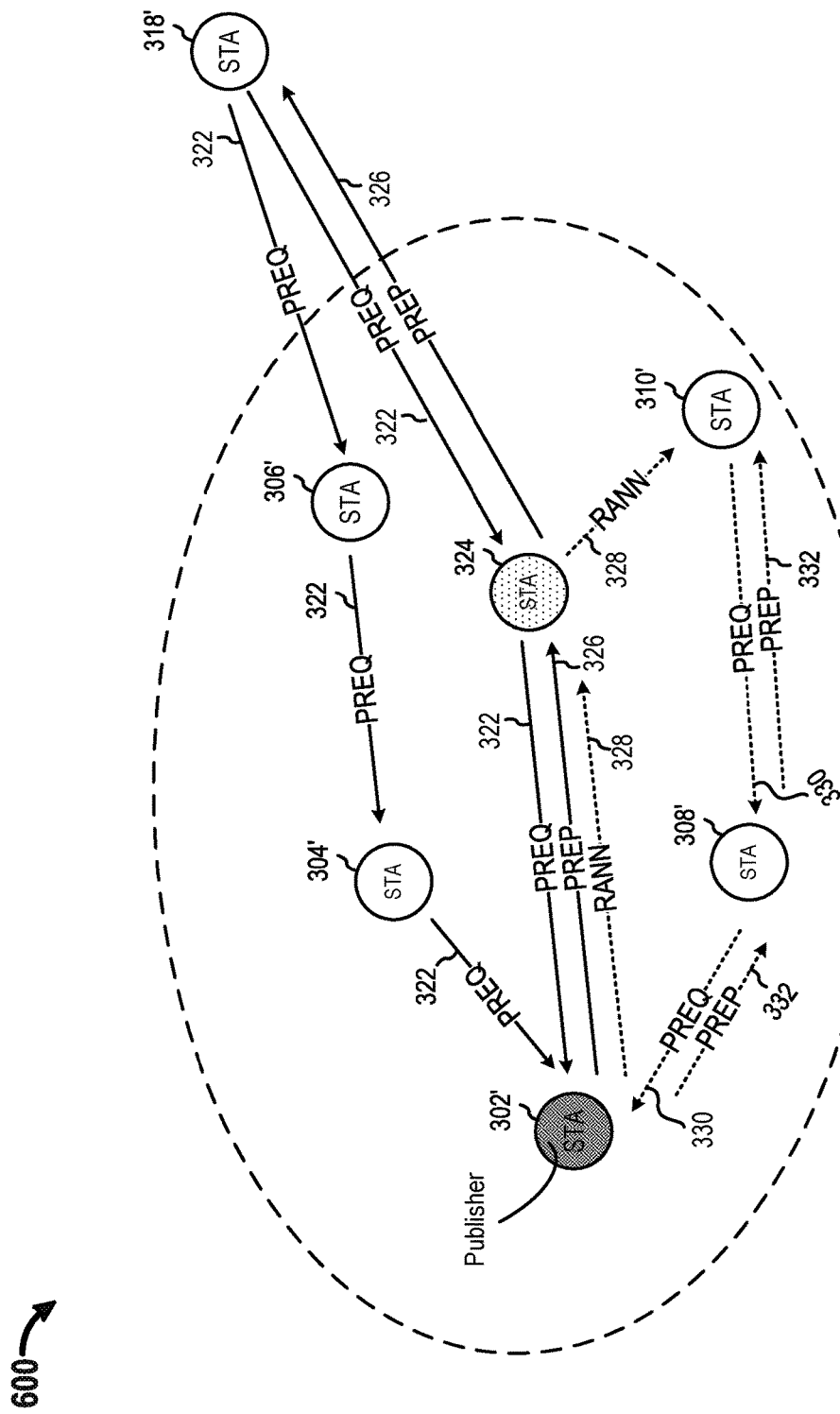
FIG. 6 is an exemplary diagram of routing mechanisms employed by STAs associated with a multi-hop service in a NAN.

FIG. 6 is an exemplary diagram 600 of routing mechanisms employed by STAs associated with a multi-hop service in a NAN. As previously discussed, the STA 302' is the publisher device of the multi-hop service in the NAN data cluster. The STAs 304', 308' have joined the multi-hop service and are directly associated with the STA 302'. The STAs 304', 308' also serve as proxying devices for the multi-hop service and transmit multi-hop attributes. Based on the transmitted multi-hop attributes from the STAs 304', 308', the STAs 306', 308' subscribed to the multi-hop service. In particular, the STA 306' associated with the STA 304', and the STA 310' associated with the STA 308'.

After subscribing to a multi-hop service, a STA may perform reactive and/or proactive routing. Reactive routing is performed once, upon association with a proxy device, to form routes to the publisher after a new device joins the network. Reactive routing may not be performed if a STA associated directly with the publisher. As discussed in FIG. 3, when a new device joins an NDL by associating with a proxy device, the proxy device may not be along the best path to the publisher. As such, the new device may initiate a route discovery to the provider by broadcasting a path request frame (PREQ), which may be encrypted using the CGK received during association. Because the PREQ is broadcasted, the PREQ may traverse different STAs (or nodes) along the path to the publisher. Each intermediate STA along the route may update a hop count in the PREQ and/or an airtime link quality metric. After the publisher receives the different PREQs, the publisher may respond with a unicast path reply (PREP) that may traverse the best path to the STA that originated the PREQ. The publisher may determine the best path, for example, based on the shortest or the best path traversed by the different PREQs among the different PREQ paths. In an aspect, STAs may determine whether they are associating directly with the publisher based on whether they joined the NDL in response to a SDA (which may only come from the publisher) or in response to a multi-hop attribute (which may indicate a MAC address of the publisher that is different from the MAC address of the sender of the multi-hop attribute). In another aspect, upon receiving the PREP, the STA originating the PREQ may determine that the best path from the publisher to the STA traverses via a different device than the current path the publisher. In this circumstance, the STA originating the PREQ may trigger an association with the different device. For example, when the STA 318' joins the NDL by associating with the STA 306', the STA 318' may initiate a route discovery to the publisher (e.g., the STA 302') because the STA 306' may not necessarily be along the shortest or best path to the STA 302'. The STA 318' may broadcast a PREQ 322, encrypted using the CGK received during the association with the STA 306'. The PREQ 322 may be received by the STA 306'. The PREQ 322 may be rebroadcasted by the STA 306' and be received by the STA 304'. Because the STA 304' is also not the publisher of the multi-hop service, the PREQ 322 may again be rebroadcasted and received by the STA 302'. Before rebroadcasting, the STA 306' may update a hop count in the PREQ 322 and/or may update an airtime link quality metric (e.g., an integer that is a cumulative indicator of the link quality between nodes; a higher number may correspond to a poorer link quality). In one aspect, the link quality matrix may be an indication of a hop count, a packet error rate (PER), packet loss, or channel conditions. The link quality matrix may be a cumulative value (e.g., a PER over multiple hops). For example, the STA 304' may set the hop count to 2. Also, if the air time link quality metric between the STAs 306', 318' was 4, and the link quality metric between STAs 304', 306' is 3, then the STA 304' may update the cumulative airtime link quality metric to 7 and rebroadcast the PREQ 322. Subsequently, the STA 302' may receive the rebroadcasted PREQ 322. Because the STA 302' is the publisher, the STA 302' may not rebroadcast the PREQ 322. Separately, although not depicted in FIG. 6, the broadcasted PREQ 322 from the STA 318' may also be received by the STA 324, which may have newly joined the NDL. The STA 324 may be directed associated with the STA 302'. The STA 324 may rebroadcast the PREQ 322, which may be received by the STA 302'. Having received the same PREQ 322 from two different paths, the STA 302' may determine the best path to the STA 318'. In an aspect, each of the received PREQ 322's may indicate a node that was visited along the path to the STA 302'. In another aspect, each of the received PREQ 322's may indicate a hop count and/or an airtime link quality metric from the STA 318'. In response, the STA 302' may transmit a PREP 326 via unicast to the STA 318'. The PREP 326 may traverse the best path as determined by the STA 302'. In an aspect, the PREP 326 may be encrypted with respective pairwise master keys as the PREP 326 traverses the path. For example, the PREP 326 may be encrypted with a pairwise master key between the STAs 302', 324, and subsequently, another pairwise master key between the STAs 324, 318'. When the STA 318' receives the PREP 326, the STA 318' may determine that the STA 306' is not along the best path to the STA 302', but rather, the STA 324 is along the best path. As such, the STA 318' may determine to associate with the STA 324 for purposes of subscribing to the multi-hop service.

Aside from reactive routing, STAs may perform proactive routing. NDL network dynamics may change continuously. For example, new devices (e.g., the STA 324) may join the NDL, and existing devices (e.g., the STA 308') may leave the network. Alternatively, existing devices may move to different positions in the network. As such, devices may periodically review and update routes to the provider. The publisher may periodically broadcast a root announcement (RANN) message to trigger route updates by subscribed devices. The RANN message may include a hop count and a metrics field, which may include airtime link metric that may be a cumulative metric from the originating STA to the current destination STA. In an aspect, the RANN may be encrypted using the CGK associated with the NDL for added security. STAs receiving the RANN may compare the hop count and/or airtime link metrics of the RANN with a previously received PREP. If the RANN indicates a better route (e.g., if the hop count and/or the airtime link metrics included in the RANN are better than those in the previously received PREP), the STA may trigger a PREQ to the publisher. For example, referring to FIG. 6, the STA 302' may periodically broadcast a RANN 328, which may be encrypted using the CGK associated with the NDL. The STAs 304', 308', 324 may receive the broadcasted RANN 328 and rebroadcast the RANN 328. The STA 310' may receive the rebroadcasted RANN 328 via the STA 324 and the STA 308'. In an aspect, the STA 308' may compare the hop count and/or the air time link metrics of the rebroadcasted RANN 328 from the STAs 308', 324 and determine if a PREQ should be triggered. In this case, the STA 310' may determine that the previous known optimal route through the STA 324 may no longer be the best route because the STA 324 may have moved farther away from the STA 302' or because the link quality via the STA 324 has deteriorated. The STA 310' may initiate a path discovery by broadcasting a PREQ 330, which may be received by the 1-hop neighbors of the STA 310'. For example, the STAs 308', 324 may receive the PREQ 330 and may rebroadcast the PREQ 330. Subsequently, the PREQ 330 may be received by the STA 302', which may determine the best path to the STA 310' based on the different paths the PREQ 330 took to be received by the STA 302'. Having determined the best path to the STA 310', the STA 302' may transmit a PREP 332 to the STA 310' via the STA 308' instead of the STA 324. The PREP 332 may indicate a hop count from the STA 302' to the STA 310' and/or an airlink quality metric from the STA 302' to the STA 310'. In another aspect, the STA 308' may determine that nothing has changed or has not changed above a threshold based on the link information in the RANN 328, and therefore, may not trigger a PREQ. In sum, for proactive routing, the STA 308' may determine not to change routes, determine to associate directly with the publisher if possible, determine to use a different route through a known neighbor node, or determine to use a different route through a newly discovery neighbor with whom the STA 308' is not associated.

In an aspect, the PREQs and PREPs may be encrypted with a CGK of the NDL. In another aspect, the PREPs may be encrypted with a pairwise key between intermediate wireless devices along the selected path.

Multi-Hop Scheduling

In addition to multi-hop service discovery and routing, STAs in a multi-hop topology may also perform multi-hop scheduling. STAs in a multi-hop topology may require scheduling so as not to cause too much network congestion and interference if all STAs transmitted at the same time. Three schemes for multi-hop scheduling are provided.

RTS/CTS-Based Multi-Hop Scheduling

A first scheduling scheme may utilize request to send (RTS) and clear to send (CTS) messages. In this scheme, one or more devices associated with the same NDL may have data to transmit. All links, whether single or multi-hop from the publisher, may have the same wake-up and transmit schedules (e.g., a same NDL schedule). In this scheme, STAs may use RTS and CTS messages to clear the medium before any transmissions. This scheme helps reduce and/or eliminate interference between neighboring and 2-hop devices.

Figure 7:
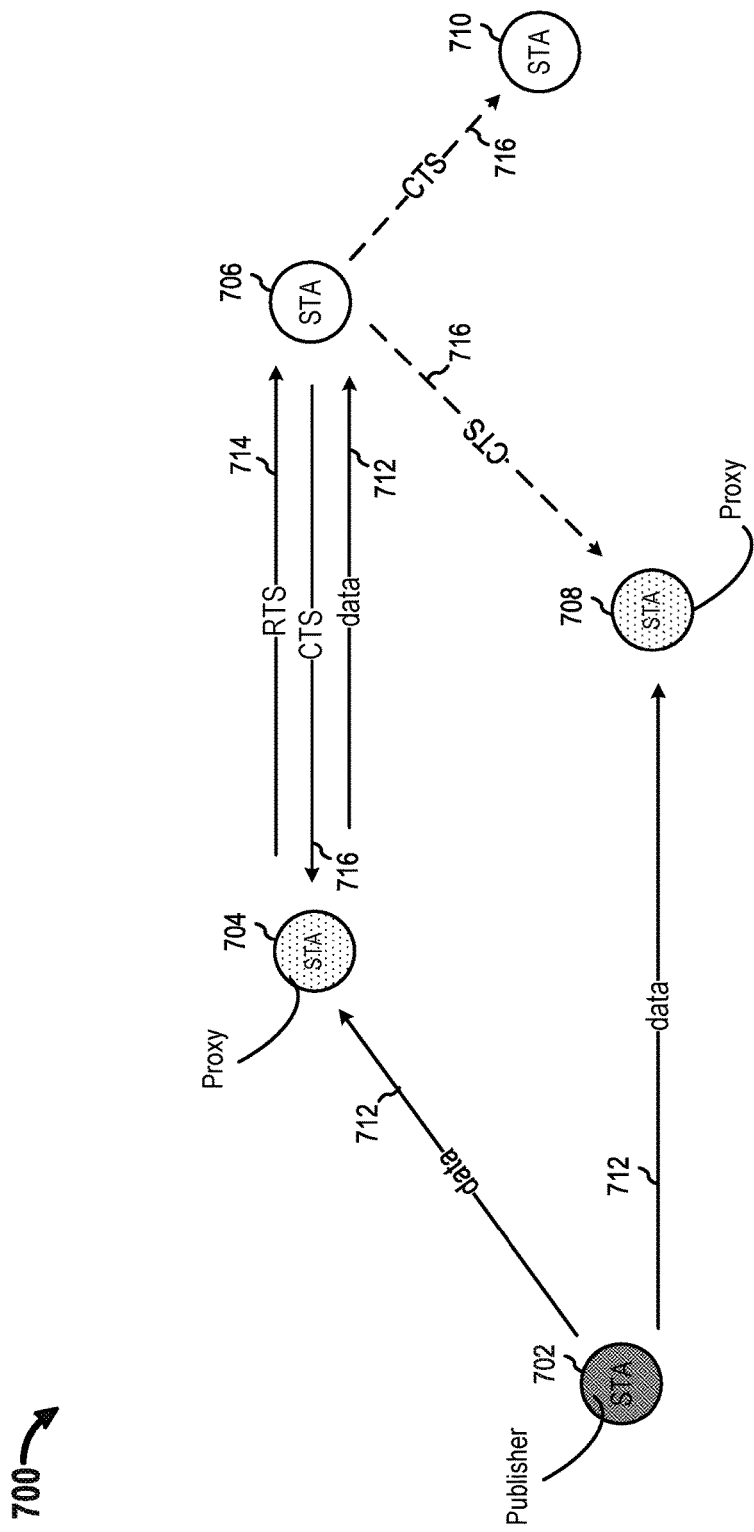
FIG. 7 is an exemplary diagram of an RTS/CTS scheme for multi-hop scheduling.

FIG. 7 is an exemplary diagram 700 of an RTS/CTS scheme for multi-hop scheduling. Referring to FIG. 7, a NAN data cluster may include STAs 702, 704, 706, 708, 710. The STA 702 may be the publisher of a multi-hop service and may transmit data 712 associated with the multi-hop service. The STAs 704, 708 may receive the data 712. The STAs 704, 708, which may serve as proxies for the multi-hop service, may also distribute the data 712. Before transmitting the data 712, the STAs 704, 708 may utilize an RTS/CTS scheduling scheme. An RTS/CTS scheme may be used to clear the medium before any transmissions, which may help reduce or eliminate interference between neighboring and 2-hop devices. In this scheme, all links (e.g., single hop links or multi-hop links from the publisher) may have the same wake-up and transmit schedule.

Referring to FIG. 7, because the STA 704 has subscribed to the multi-hop service, the STA 704 may retransmit any data received from the STA 704. In FIG. 7, the STA 704 may or may not be aware of the STA 708, depending on the distance between the devices. The STA 710 may be hidden from the STA 704, and therefore, transmissions from the STA 710 may interfere with the reception of transmissions from the STA 704 at the STA 706. To reduce or eliminate interference (e.g., from the hidden node effect), before the STA 704 transmits the data 712, the STA 704 may first transmit (or broadcast) an RTS message 714. Upon receiving the RTS message 714, the STA 706 may transmit (or broadcast) a CTS message 716. The CTS message 716 may also be received by the STAs 708, 710, which may not transmit based on the received CTS message 716, thereby clearing the medium for the STA 704 to transmit. Subsequently, the STA 704 may transmit the data 712.

An advantage of the RTS/CTS scheme is that the scheme does not require devices to run elaborate schedule algorithms or gather information from neighbors. However, the RTS/CTS scheme incurs overhead (e.g., message exchanges) before every transmission. In addition, the RTS/CTS scheme may not provide devices with a dedicated time and/or channel for transmission. Instead, the devices contend for medium access with its 1-hop and 2-hop neighbors.

Per Link Schedule Allocation

A second scheduling scheme is per link schedule allocation. Per link schedule allocation is a coordinated scheduling scheme based on token passing. A device in possession of the token assumes the scheduler role and runs the scheduling algorithm before passing the token to a neighbor. The token holder runs the scheduling algorithm locally based on the network degree of the token holder and the published schedule of the token holder's 1-hop and 2-hop neighbors. Subsequently, the token holder published a local schedule associated with the token holder. The token holder then selects and passes the token to the next token holder. The per link schedule allocation scheme may be initiated periodically at the publisher (or source) device, which serves as the first token holder. The token is then passed to the respective children of the publisher device, to any children of the children, etc. In an aspect, the token may include a sequence number, and each time the publisher initiates the scheduling algorithm, a new sequence number is generated.

Figure 8:
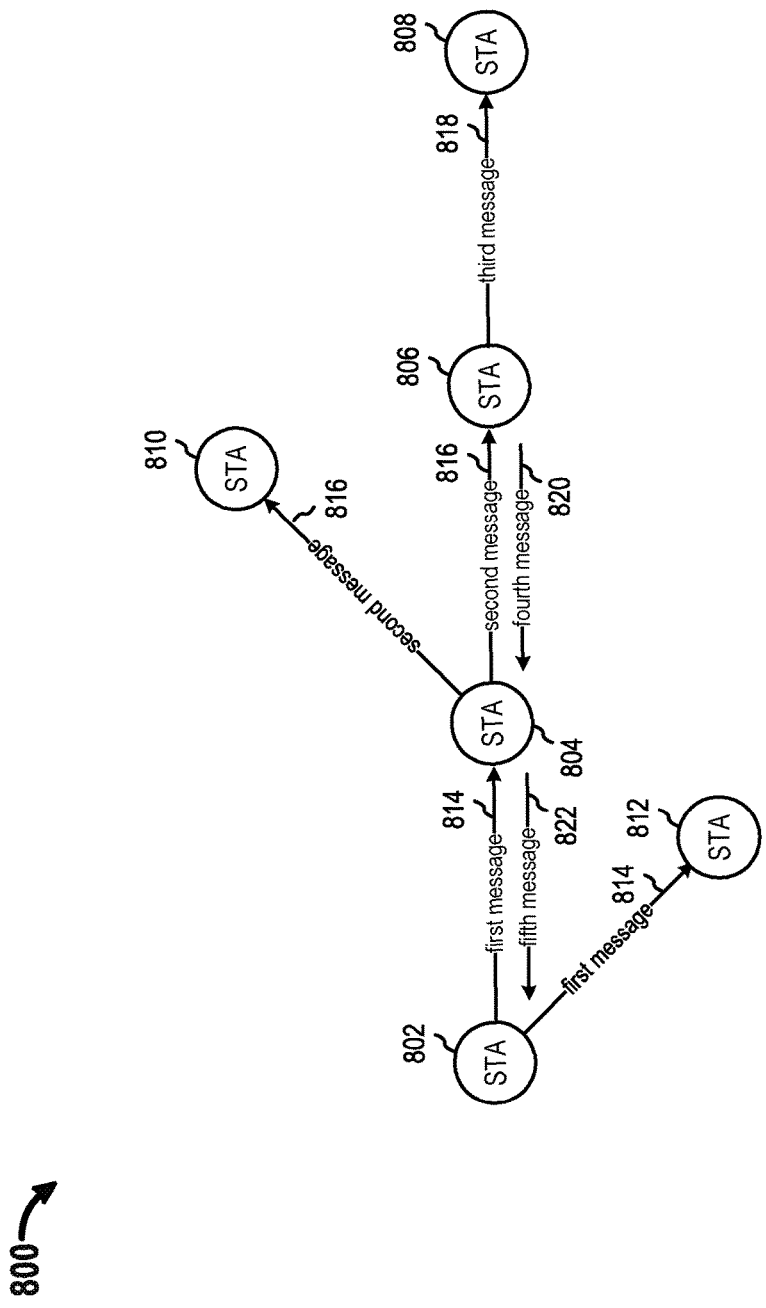
FIG. 8 is an exemplary diagram of a per link schedule allocation scheme for multi-hop scheduling.

FIG. 8 is an exemplary diagram 800 of a per link schedule allocation scheme for multi-hop scheduling. Referring to FIG. 8, a NAN data cluster may include STAs 802, 804, 806, 808, 810, 812. The STA 802 may be the publisher of a multi-hop service. The STA 802 may initiate the scheduling algorithm by determining that the STA 802 has the scheduler role and by determining a sequence number for the token (e.g., a sequence number is 1). The STA 802 may compute a schedule for each of its links (e.g., 2 links, one to the STA 804, another to the STA 812). The STA 802 may query each child node to get the network degree (e.g., a number of links) for each child node. In this example, the STA 802 may query the STA 804 and determine that the STA 804 has a network degree of 2. The STA 802 may query the STA 812 and determine that the STA 812 has a network degree of 1. Based on the local network degree of the STA 802 (e.g., 2), the STA 802 may compute the number of base time-blocks required (e.g., 1 time block per link). In an aspect, each base time-block may be 16 ms in duration. In another aspect, the base time-blocks may repeat over discovery windows, which may be 512 ms in duration. The base time-blocks may repeat based on quality of service and/or latency requirements associated with a multi-hop service. The STA 802 may determine a local schedule for transmitting to the STAs 804, 812 based on a combination of the base time-blocks and available channels (e.g., frequencies).

After determining the local schedule, the STA 802 may announce the computed schedule by transmitting the local schedule in a first message 814 to all neighbors. In one aspect, the first message 814 may be transmitted via broadcast. In another aspect, the first message 814 may be transmitted via unicast. The first message 814 may be received by the STAs 804, 812. The STAs 804, 812 may save a copy of the local schedule of the STA 802 and associate it with the sequence number indicated in the first message 814. The first message 814 may include a current sequence number (as determined by the STA 802), the computed schedule, and the known schedule of any 1-hop neighbors associated with the same sequence number. In this case, because the STA 802 is the publisher of the multi-hop service, there may not be any known schedules of 1-hop neighbors associated with the sequence number yet. In an aspect, child nodes and neighbor nodes may be different. A child node may refer to a downstream device along a path traversed by the PREP during route formation/discovery (e.g., associated with the active link). By contrast, a neighbor node may refer to any device within 1-hop range. A neighbor node need not be a node along the transmission path during route discovery. As such, a child node may be a neighbor node, but a neighbor node is not necessarily a child node.

After determining the local schedule, the STA 802 may pass the scheduler role (or the token) to a child node with the highest network degree. Referring to FIG. 8, the STA 804 has a network degree of 2, whereas the STA 812 has a network degree of 1. The STA 802 may pass the scheduler role to the STA 804 because the STA 804 has the higher network degree. In an aspect, the scheduler role may be passed via the first message 814. For example, if the first message 814 is broadcasted, the first message 814 may indicate the identity (e.g., medium access control (MAC) address or another identifier) of the STA 804 (e.g., in a scheduler role field or a next scheduler field). In another example, if the first message 814 is transmitted via unicast, then the MAC address of the STA 804 may be indicated in the first message 814 to the STA 804. Also, the first message 814 may include a field (e.g., a bit indicator) set to 1 if the scheduler role (or token) is to be passed to the STA 804 or set to 0 if the scheduler role is not to be passed to the STA 804. A different first message 814 with the MAC address of the STA 812 may be transmitted via unicast to the STA 812. In this different message, the scheduler role field may be set to 0. Regardless of whether the first message 814 is transmitted via broadcast or unicast, the STA 804 may transmit an acknowledgment to the STA 802 indicating acknowledgment of the scheduler role upon receiving the first message 814.

Upon receiving the first message 814, the STA 804 may perform the scheduling algorithm by computing a schedule for each of its links. The STA 804 may query child nodes to get each nodes network degree. The STA 810 has a network degree of 1, and the STA 806 has a network degree of 2. The STA 804 will use its local network degree to compute the number of base time-blocks required. The STA 804 will use 3 base time-blocks. Based on a combination of the base time-blocks and available frequencies, the STA 804 will determine a local schedule that does not conflict with the schedule of 1-hop and 2-hop neighbors that may have announced the schedule with the current sequence number. The local schedule may have a sequence number of 1 as indicated in the first message 814. In this example, the local schedule of the STA 804 may not conflict with the local schedule of the STA 802, also having a sequence number 1, received in the first message 814.

After determining the local schedule, the STA 804 may announce the computed schedule by transmitting the local schedule in a second message 816 to all neighbors. In one aspect, the second message 816 may be transmitted via broadcast or unicast. The second message 816 may be received by the STAs 810, 806, 802. The STAs 810, 806, 802 may save a copy of the local schedule of the STA 804 and associate it with the sequence number indicated in the second message 816. The second message 816 may include a current sequence number (as determined by the STA 802), the computed schedule, and the known schedule of any 1-hop neighbors associated with the same sequence number. In this case, the STA 804 may include the local schedule of the STA 802 in the second message 816 based on the sequence number.

After determining the local schedule, the STA 804 may pass the scheduler role (or the token) to a child node with the highest network degree. Referring to FIG. 8, the STA 806 has a network degree of 2, whereas the STA 810 has a network degree of 1. The STA 804 may pass the scheduler role to the STA 806 because the STA 806 has the higher network degree. In an aspect, the scheduler role may be passed via the second message 816. For example, if the second message 816 is broadcasted, the second message 816 may indicate the identity (e.g., MAC address or another identifier) of the STA 806. In another example, if the second message 816 is transmitted via unicast, then the MAC address of the STA 806 may be indicated in the second message 816 to the STA 806. Also, the second message 816 may include a field (e.g., a bit indicator) set to 1 if the scheduler role (or token) is to be passed to the STA 806 or set to 0 if the scheduler role is not to be passed to the STA 806. A different second message 816 with the MAC address of the STA 810 may be transmitted via unicast to the STA 810. Regardless of whether the second message 816 is transmitted via broadcast or unicast, the STA 806 may transmit an acknowledgment to the STA 804 indicating acknowledgment of the scheduler role upon receiving the second message 816.

Upon receiving the second message 816, the STA 806 may perform the scheduling algorithm by computing a schedule for each of its two links. However, because a schedule has already been computed with respect to the link with the STA 804, the STA 806 may only compute the schedule for the STA 808. The STA 806 may query child nodes to get each nodes network degree. In this case, the STA 808 may indicate that the STA 808 has a network degree of 1 because the STA 808 has no child nodes. The STA 806 will use its local network degree and determine that the STA 806 requires 2 base time-blocks required. Based on a combination of the base time-blocks and available frequencies, the STA 806 may determine a local schedule that does not conflict with the schedule of 1-hop and 2-hop neighbors that may have announced the schedule with the current sequence number. The local schedule may have a sequence number of 1 as indicated in the first and second messages 814, 816. In this example, the local schedule of the STA 806 may not conflict with the local schedule of the STAs 802, 804, both of which have a sequence number 1.

After determining the local schedule, the STA 806 may announce the computed schedule by transmitting the local schedule in a third message 818 to all neighbors. In one aspect, the third message 818 may be transmitted via broadcast or unicast. The third message 818 may be received by the STA 808. The STA 808 may save a copy of the local schedule of the STA 806 and associate it with the sequence number indicated in the third message 818. The third message 818 may include a current sequence number (as determined by the STA 802), the computed schedule, and the known schedule of any 1-hop neighbors associated with the same sequence number. In this case, the STA 806 may include the local schedule of the STA 804 in the third message 818 based on the sequence number.

After determining the local schedule, the STA 806 may not pass the scheduler role (or the token) to a child node because the STA 808 is the only child node and the STA 808 only has a network degree of 1. In other words, the token holder may pass the scheduler role onto a child node when the child node has a network degree greater than 1. Because all the children of the STA 806 have completed scheduling, the STA 806 may return the token or scheduler role to its parent (or the STA 804) by transmitting a fourth message 820. In an aspect, when a child node returns the token to its parent, the child node may include the known schedules of the child node's children. For example, the fourth message 820 may include the local schedule of the STA 808. In another aspect, the fourth message 820 may be broadcast or unicast. If the fourth message 820 is broadcast, then a scheduler role field in the fourth message 820 may indicate that the STA 804 (e.g., the MAC address). If the fourth message 820 is unicast, then an address field may include the MAC address of the STA 804, and a scheduler field (e.g., a bit field) may be set to 1 to indicate that the scheduler role is being returned to the STA 804.

Upon receiving the fourth message 820, the STA 804 may pass the token to another child with the next highest degree. In this case, the STA 810 is the only remaining child of the STA 804. However, because the STA 810 does not have a network degree greater than 1, the STA 804 does not need to transmit the scheduler role to the STA 810 because the schedule between the STA 810 and the STA 804 was already computed by the STA 804. Because the STA 804 has no more children to pass the scheduler role to, the STA 804 may return the scheduler role to the STA 802 via a fifth message 822. In an aspect, the fifth message 822 may include the local schedule for the STA 806.

Upon receiving the fifth message 822, the STA 802 may pass the token to another child with the next highest degree. In this case, the STA 812 is the only remaining child of the STA 802. However, because the STA 812 does not have a network degree greater than 1, the STA 802 does not need to transmit the scheduler role to the STA 812 because the schedule between the STA 802 and the STA 812 was already computed by the STA 802. Because the STA 802 has no more children, the instance of the scheduling algorithm has been completed. In other words, once every device associated with the NDL has performed the scheduling algorithm, the token will have returned to the source device (e.g., the STA 802) where the algorithm first started.

TABLE 1

Per Link Allocation Scheduling Flow

| Previous | Scheduler | Time Block 1 | Time Block 2 | Time Block 3 |
|---|---|---|---|---|
| — | 802 (source) | CH1 (804) | CH1 (812) | X |
| 802 | 804 | CH1 (802) | CH2 (810) | CH1 (806) |
| 804 | 806 | CH2 (808) | X | CH1 (804) |
| 806 | 804 | — | — | — |
| 804 | 802 | — | — | — |

Table 1 illustrates an exemplary scheduling flow for per link allocation based on the multi-hop topology as illustrated in FIG. 8. As shown in Table 1, the STA 802 initiates the scheduling algorithm as the source node/publisher of the multi-hop service. Assuming there are 3 time blocks and 2 channels for communication, the STA 802 may determine to use two time blocks (e.g., time blocks 1, 2, 3) of channel 1 for communicating with the STA 804 and the STA 812. Subsequently, the STA 802 may pass the scheduler role to the STA 804. Because the STA 804 has 3 links, the STA 804 may require 3 time blocks. Based on the schedule previously computed by the STA 802, time block 1 at channel 1 is used for communication between the STAs 802, 804. The STA 804 may determine that channel 1 at time block 2 is already occupied by another link (e.g., between the STAs 802, 812 as announced in the first message 814). Accordingly, the STA 804 may use channel 2 in time block 2. For the third link, the STA 804 may use channel 1 at time block 3. Next, the STA 804 may pass the token to STA 806. Because the STA 806 has 2 links, the STA 806 may require 2 time blocks. Because channel 1 on time block 1 is already occupied by the link between the STAs 802, 804 (as announced by the STA 804 in the second message 816), the STA 806 may use channel 2 at time block 1 for the link between the STAs 806, 808. As for the second link with the STA 804, the STA 806 may use the schedule previously computed by the STA 804 as announced in the second message 816. The STA 806 may determine not to pass the scheduler role to the STA 808 because the STA 808 has no children. Accordingly, the scheduler role may be returned to the STA 804. The STA 804 may also determine not to pass the scheduler role to the STA 810 because the STA 810 has a network degree of 1, and therefore, the STA 804 may return the scheduler role to the STA 802. The STA 802 may also not pass the scheduler role to the STA 812 because the STA 812 has a network degree of 1. Accordingly, the current instance of the scheduling algorithm ends when scheduler role returns to the source and cannot be passed to another node.

In per link schedule allocation, paging may be optional because devices are assigned a dedicated time and channel for transmitting data. Paging may be used, however, to improve power save.

Per Hop Schedule Allocation

A third scheduling scheme is per hop schedule allocation. Per hop schedule allocation is a coordinated scheduling scheme based on token passing and is similar to per link schedule allocation. A device in possession of the token assumes the scheduler role and runs the scheduling algorithm before passing the token to a neighbor. The token holder runs the scheduling algorithm locally based on the network degree of the token holder and the published schedule of the token holder's 1-hop and 2-hop neighbors. Subsequently, the token holder published a local schedule associated with the token holder. However, unlike per link schedule allocation, in per hop allocation, 1-hop links may share a common schedule. After determining the local schedule, the token holder then selects and passes the token to the next token holder. The per hop schedule allocation scheme may be initiated periodically at the publisher (or source) device, which serves as the first token holder. The token is then passed to the respective children of the publisher device, to any children of the children, etc. In an aspect, the token may include a sequence number, and each time the publisher initiates the scheduling algorithm, a new sequence number is generated.

Figure 9:
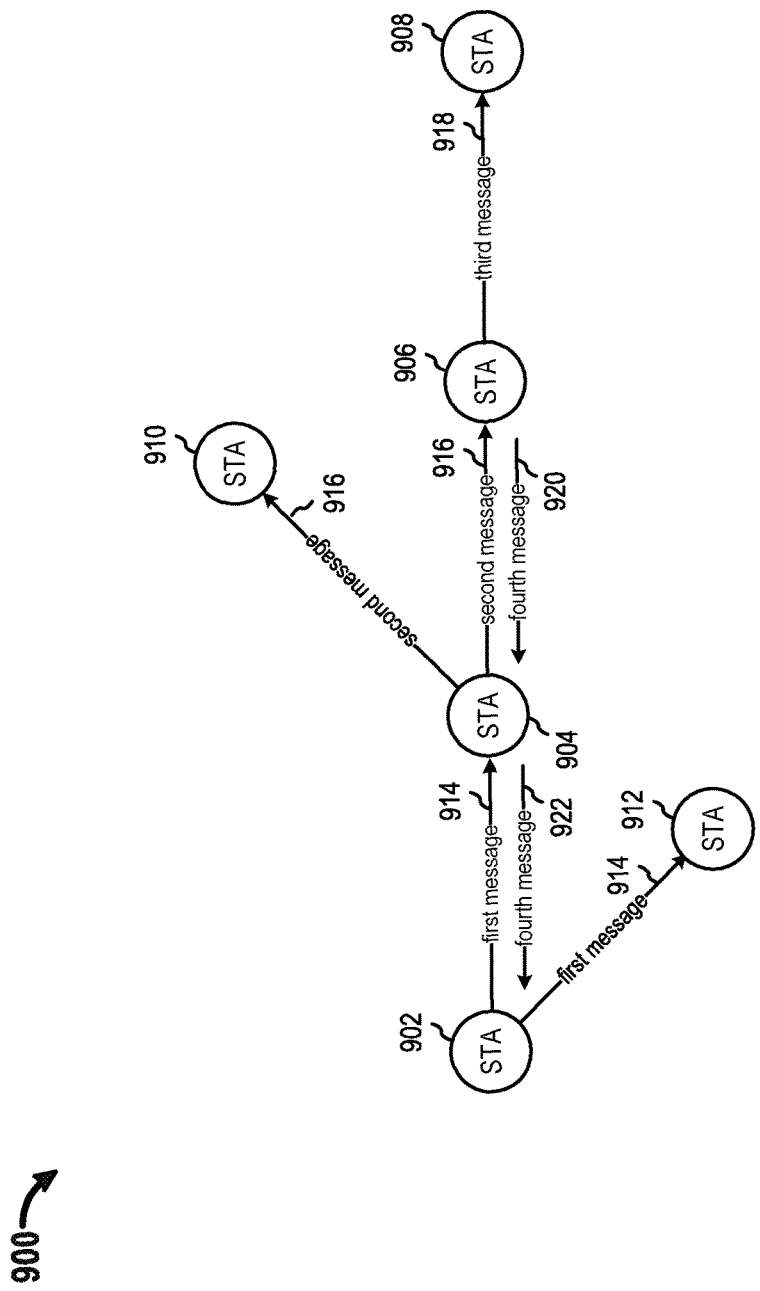
FIG. 9 is an exemplary diagram of a per hop schedule allocation scheme for multi-hop scheduling.

FIG. 9 is an exemplary diagram 900 of a per hop schedule allocation scheme for multi-hop scheduling. The per hop schedule allocation scheme may have some similarities with the per link schedule allocation scheme, except that instead of each link having a dedicated resource in the schedule, in per hop schedule allocation, each link at a device may share the same schedule. With per hop schedule allocation, only devices with more than one neighbor may need to perform the scheduling algorithm. Referring to FIG. 9, a NAN data cluster may include STAs 902, 904, 906, 908, 910, 912. The STA 902 may be the publisher of a multi-hop service. The STA 902 may initiate the scheduling algorithm by determining that the STA 902 has the scheduler role and by determining a sequence number for the token (e.g., a sequence number is 1). The STA 902 may compute its local schedule. The STA 902 may query each child node to get the network degree (e.g., a number of links) for each child node in order to determine which node to pass the token/scheduler role to next. In this example, the STA 902 may query the STA 904 and determine that the STA 904 has a network degree of 2. The STA 902 may query the STA 912 and determine that the STA 912 has a network degree of 1. The STA 902 may compute its local schedule using a combination of available time-block and channel resources to ensure that the local schedule does not conflict with the schedule of 1-hop and 2-hop neighbors that announced the schedule with the current sequence number. However, because the STA 902 is the initiator of the scheduling algorithm, there may not be any other schedules with the same sequence number. Referring to FIG. 9, the first link between the STAs 902, 904 and the second link between the STAs 902, 912 may share the same schedule. That is, every STA within 1-hop of the STA 902 may have the same schedule. In one aspect, the STA 902 may differentiate whether the STA 902 has traffic for the STA 904 or the STA 912 by sending a paging message in a paging window (e.g., the first paging window 258). The paging message may indicate that the STA 902 has traffic for the STA 904. The STA 904 may stay awake for the remainder of the time block to receive the traffic, but the STA 912 may go to sleep, thereby saving power. In another, the STA 902 may have traffic for the STAs 904, 912 and the STAs 904, 912 may also have traffic for the STA 902. As such, the devices may all transmit during the paging window to indicate that traffic is available. In this aspect, because of the increased traffic, the throughput may be reduced.

After determining the local schedule, the STA 902 may announce the computed schedule by transmitting the local schedule in a first message 914 to all neighbors. In one aspect, the first message 914 may be transmitted via broadcast. In another aspect, the first message 914 may be transmitted via unicast. The first message 914 may be received by the STAs 904, 912. The STAs 904, 912 may save a copy of the local schedule of the STA 902 and associate the local schedule with the sequence number indicated in the first message 914. The first message 914 may include a current sequence number (as determined by the STA 902), the computed local schedule, and the known schedule of any 1-hop neighbors associated with the same sequence number. In this case, because the STA 902 is the publisher of the multi-hop service, there may not be any known schedules of 1-hop neighbors associated with the sequence number yet.

After determining the local schedule, the STA 902 may pass the scheduler role (or the token) to a child node with the highest network degree. Referring to FIG. 9, the STA 904 has a network degree of 2, whereas the STA 912 has a network degree of 1. Nodes with a network degree of 1 may be skipped for purposes of scheduler role assignment. The STA 902 may pass the scheduler role to the STA 904 because the STA 904 has the higher network degree. In an aspect, the scheduler role may be passed via the first message 914. For example, if the first message 914 is broadcasted, the first message 914 may indicate the identity (e.g., medium access control (MAC) address or another identifier) of the STA 904 (e.g., in a scheduler role field or a next scheduler field). In another example, if the first message 914 is transmitted via unicast, then the MAC address of the STA 904 may be indicated in the first message 914 to the STA 904. Also, the first message 914 may include a field (e.g., a bit indicator) set to 1 if the scheduler role (or token) is to be passed to the STA 904 or set to 0 if the scheduler role is not to be passed to the STA 904. A different first message 914 with the MAC address of the STA 912 may be transmitted via unicast to the STA 912. In this different message, the scheduler role field may be set to 0. Regardless of whether the first message 914 is transmitted via broadcast or unicast, the STA 904 may transmit an acknowledgment to the STA 902 indicating acknowledgment of the scheduler role upon receiving the first message 914.

Upon receiving the first message 914, the STA 904 may perform the scheduling algorithm by computing its local schedule. The STA 904 may query child nodes to get each nodes network degree. The STA 910 has a network degree of 1, and the STA 906 has a network degree of 2. Based on a combination of the base time-blocks and available frequencies, the STA 904 will determine a local schedule that does not conflict with the schedule of 1-hop and 2-hop neighbors that may have announced the schedule with the current sequence number. The local schedule may have a sequence number of 1 as indicated in the first message 914. In this example, the local schedule of the STA 904 may not conflict with the local schedule of the STA 902, also having a sequence number 1, received in the first message 914.

After determining the local schedule, the STA 904 may announce the computed schedule by transmitting the local schedule in a second message 916 to all neighbors. In one aspect, the second message 916 may be transmitted via broadcast or unicast. The second message 916 may be received by the STAs 910, 906, 902. The STAs 910, 906, 902 may save a copy of the local schedule of the STA 904 and associate it with the sequence number indicated in the second message 916. The second message 916 may include a current sequence number (as determined by the STA 902), the computed schedule, and the known schedule of any 1-hop neighbors associated with the same sequence number. In this case, the STA 904 may include the local schedule of the STA 902 in the second message 916 based on the sequence number.

After determining the local schedule, the STA 904 may pass the scheduler role (or the token) to a child node with the highest network degree. Referring to FIG. 9, the STA 906 has a network degree of 2, whereas the STA 910 has a network degree of 1. The STA 904 may pass the scheduler role to the STA 906 because the STA 906 has the higher network degree. In an aspect, the scheduler role may be passed via the second message 916. For example, if the second message 916 is broadcasted, the second message 916 may indicate the identity (e.g., MAC address or another identifier) of the STA 906. In another example, if the second message 916 is transmitted via unicast, then the MAC address of the STA 906 may be indicated in the second message 916 to the STA 906. Also, the second message 916 may include a field (e.g., a bit indicator) set to 1 if the scheduler role (or token) is to be passed to the STA 906 or set to 0 if the scheduler role is not to be passed to the STA 906. A different second message 916 with the MAC address of the STA 910 may be transmitted via unicast to the STA 910. Regardless of whether the second message 916 is transmitted via broadcast or unicast, the STA 906 may transmit an acknowledgment to the STA 904 indicating acknowledgment of the scheduler role upon receiving the second message 916.

Upon receiving the second message 916, the STA 906 may perform the scheduling algorithm by computing a local schedule. The STA 906 may query child nodes to get each nodes network degree. In this case, the STA 908 may indicate that the STA 908 has a network degree of 1 because the STA 908 has no child nodes. Based on a combination of the base time-blocks and available frequencies, the STA 906 may determine a local schedule that does not conflict with the schedule of 1-hop and 2-hop neighbors that may have announced the schedule with the current sequence number. However, because a schedule has already been computed with respect to the link with the STA 904, the STA 906 may only compute the schedule for the STA 908. The local schedule may have a sequence number of 1 as indicated in the first and second messages 914, 916. In this example, the local schedule of the STA 906 may not conflict with the local schedule of the STAs 902, 904, both of which have a sequence number 1.

After determining the local schedule, the STA 906 may announce the computed schedule by transmitting the local schedule in a third message 918 to all neighbors. In one aspect, the third message 918 may be transmitted via broadcast or unicast.

The third message 918 may be received by the STA 908. The STA 908 may save a copy of the local schedule of the STA 906 and associate it with the sequence number indicated in the third message 918. The third message 918 may include a current sequence number (as determined by the STA 902), the computed schedule, and the known schedule of any 1-hop neighbors associated with the same sequence number. In this case, the STA 906 may include the local schedule of the STA 904 in the third message 918 based on the sequence number.

After determining the local schedule, the STA 906 may not pass the scheduler role (or the token) to a child node because the STA 908 is the only child node and the STA 908 only has a network degree of 1. In other words, the token holder may pass the scheduler role onto a child node when the child node has a network degree greater than 1. Because all the children of the STA 906 have completed scheduling, the STA 906 may return the token or scheduler role to its parent (or the STA 904) by transmitting a fourth message 920. In an aspect, when a child node returns the token to its parent, the child node may include the known schedules of the child node's children. For example, the fourth message 920 may include the local schedule of the STA 908. In another aspect, the fourth message 920 may be broadcast or unicast. If the fourth message 920 is broadcast, then a scheduler role field in the fourth message 920 may indicate that the STA 904 (e.g., the MAC address). If the fourth message 920 is unicast, then an address field may include the MAC address of the STA 904, and a scheduler field (e.g., a bit field) may be set to 1 to indicate that the scheduler role is being returned to the STA 904.

Upon receiving the fourth message 920, the STA 904 may pass the token to another child with the next highest degree. In this case, the STA 910 is the only remaining child of the STA 904. However, because the STA 910 does not have a network degree greater than 1, the STA 904 does not need to transmit the scheduler role to the STA 910 because the schedule between the STA 910 and the STA 904 was already computed by the STA 904. Because the STA 904 has no more children to pass the scheduler role to, the STA 904 may return the scheduler role to the STA 902 via a fifth message 922. In an aspect, the fifth message 922 may include the local schedule for the STA 906.

Upon receiving the fifth message 922, the STA 902 may pass the token to another child with the next highest degree. In this case, the STA 912 is the only remaining child of the STA 902. However, because the STA 912 does not have a network degree greater than 1, the STA 902 does not need to transmit the scheduler role to the STA 912 because the schedule between the STA 902 and the STA 912 was already computed by the STA 902. Because the STA 902 has no more children, the instance of the scheduling algorithm has been completed. In other words, once every device associated with the NDL has performed the scheduling algorithm, the token will have returned to the source device (e.g., the STA 902) where the algorithm first started.

TABLE 2

Per Hop Allocation Scheduling Flow

| Previous | Scheduler | Time Block 1 | Time Block 2 |
|---|---|---|---|
| — | 902 (source) | CH1 (904, 912) | X |
| 902 | 904 | CH1 (902) | CH1 (910, 906) |
| 904 | 906 | CH2 (908) | CH1 (904) |
| 906 | 904 | — | — |
| 904 | 902 | — | — |

Table 2 illustrates an exemplary scheduling flow for per hop allocation based on the multi-hop topology as illustrated in FIG. 9. As shown in Table 2, the STA 902 initiates the scheduling algorithm as the source node/publisher of the multi-hop service. Assuming there are 2 time blocks and 2 channels for communication, the STA 902 may determine to use the first time block (e.g., time block 1) of channel 1 for communicating with the STA 904 and the STA 912. Subsequently, the STA 902 may pass the scheduler role to the STA 904. The STA 904 has links with the STAs 902, 906, 910. Based on the schedule previously computed by the STA 902, time block 1 at channel 1 is used for communication between the STA 902 and the STAs 904, 912. As such, the STA 904 need not recompute the schedule for communicating with the STA 902. However, the STA 904 may determine a schedule for communicating with the STAs 910, 906 that does not conflict with the local schedule of the STA 902. In an aspect, the STA 904 may use channel 1 at time block 2 for communicating with the STAs 910, 906. Next, the STA 904 may pass the token to STA 906, which has links with the STAs 904, 908. Because the schedule with respect to the STA 904 has already been determined, the STA 906 need only determine a schedule for the STA 908. The STA 906 may select channel 2 at time block 1 for communicating with the STA 908. Subsequently, the STA 906 may determine not to pass the scheduler role to the STA 908 because the STA 908 has no children. Accordingly, the scheduler role may be returned to the STA 904. The STA 904 may also determine not to pass the scheduler role to the STA 910 because the STA 910 has a network degree of 1, and therefore, the STA 904 may return the scheduler role to the STA 902. The STA 902 may also not pass the scheduler role to the STA 912 because the STA 912 has a network degree of 1. Accordingly, the current instance of the scheduling algorithm ends when scheduler role returns to the source and cannot be passed to another node.

In another aspect, the publisher may have an option of selecting between either per link scheduling allocation or per hop scheduling allocation. For example, a STA that is publishing a multi-hop service may select between the per link or per hop scheduling algorithms based on requirements of the multi-hop service. The per hop scheduling algorithms may be more suitable for services with bursty traffic in which the schedule may be underutilized (e.g., short-term file-sharing services). By contrast, the per link scheduling algorithm may be more suitable for services that require consistent bandwidth for data communication (e.g., real-time services such as multi-gaming).

In another aspect, per link and per hop schedule allocation may be performed without token passing. That is, a STA need not be assigned the scheduler role. Instead, all of the devices in the NDL may select per link or per hop scheduling allocation. Each STA may, determine based on the selection, a local schedule associated with the STA for communicating with other STAs in the NDL. Each STA may then broadcast the determined local schedule. In some instances, the determined local schedule may be encrypted based on the CGK. In this aspect, if the local schedule determined based on per link or per hop schedule allocation causes a collisions above a threshold, then the STA may select a different schedule.

FIG. 10A illustrates an exemplary data and/or control frame 1000 for multi-hop topologies. Referring to FIG. 10A, the frame 1000 may include a frame control field 1002 that includes control information related to the frame 1000. The frame 1000 may include a duration field 1004 that indicates the duration of the frame 1000 after the duration field. The frame 1000 may include four address fields—address 1 1006, address 2 1008, address 3 1010, and address 4 1012. A first address field (address 1 1006) may include the address of the original sender of the frame or the data. A second address field (address 2 1008) may include the address of the current sender (e.g., an intermediate sender) of the frame in a multi-hop topology. A third address field (address 3 1008) may indicate a current recipient of the frame (e.g., an intermediate recipient). Finally, a fourth address field (address 4 1012) may indicate the destination address of the data. A sequence control field 1014 may indicate the sequence number associated with any data that is being transmitted in the frame for detecting duplicate data. In an aspect, the frame 1000 may include a time to live (TTL) field to indicate a maximum hop count value. In another aspect, the frame 1000 may include a group ID field to indicate which NDL group the frame 1000 belongs to so that a receiving STA may filter packets or make decisions on which security key to use if the STA is part of multiple NDL groups, for example. In another aspect, the frame 1000 may include a QoS field 1016 that may indicate the quality of service requirements for the multi-hop service. The QoS field may include a bit that indicates whether a mesh control field 1022 is present in a body field 1018 of the frame 1000. The mesh control field may include control information related to the multi-hop service. Finally, the frame 1000 may include a frame check sequence (FCS) field 1020 for error detection. In an aspect, the frame 1000 may include other fields related to multi-hop topologies in an NDL. In another aspect, the various fields in the frame may be provided in a different order than the order illustrated in FIG. 10A.

FIG. 10B illustrates an exemplary diagram 1050 of a service discovery frame. The service discovery frame (SDF) in FIG. 10B includes a SDA 1076 for service A published by a STA (e.g., the STA 302). The SDA 1076 for service A may point to an NDL attribute 1080 for service A via a binding bitmap in the SDA, for example. The STA may also be serving a proxy device for another STA publishing service B. Therefore, the service discovery frame may also include a multi-hop attribute 1078 for service B that points to an NDL attribute 1082 for service B, via a binding bitmap in the multi-hop attribute. Although FIG. 10B illustrates a single SDA and a single multi-hop attribute, the service discovery frame may include any number of SDAs and multi-hop attributes. The SDA 1076 for service A may include an attribute ID 1052, a length field 1054, and an attribute body 1056. The attribute body 1056 may include one or more of a service ID, instance ID, requestor instance ID, service control, binding bitmap, service info length, and service info as shown in FIG. 4A. The multi-hop attribute 1078 for service B may include an attribute ID 1058, a length field 1060, and an attribute body 1062. The attribute body 1062 may include one or more of a service ID, instance ID, requestor instance ID, service control, binding bitmap, service info length, and service info as shown in FIG. 4B. The NDL attribute 1080 for service A may include an attribute ID 1064, an length field 1066, and an attribute body 1068. The attribute body 1068 may include one or more of an NDL control, NDC ID, NDL ID, immutable schedule tag, QoS tag, map ID, time bitmap control, and time bitmap as shown in FIG. 5. The multi-hop attribute 1078 for service B may include an attribute ID 1058, a length field 1060, and an attribute body 1062. The attribute body 1062 may include one or more of a service ID, instance ID, requestor instance ID, service control, binding bitmap, service info length, and service info as shown in FIG. 4B. The NDL attribute 1082 for service B may include an attribute ID 1070, an length field 1072, and an attribute body 1074. The attribute body 1074 may include one or more of an NDL control, NDC ID, NDL ID, immutable schedule tag, QoS tag, map ID, time bitmap control, and time bitmap as shown in FIG. 5.

In an aspect, all of the fields and elements illustrated in figures (e.g., FIGS. 10A and 10B) may be optional. For example, the frames provided in FIGS. 10A and 10B need not include all of the fields but may include a subset of the fields. Similarly the SDA and the MHA may include all of a subset of fields shown in FIGS. 4A and 4B.

Figure 11:
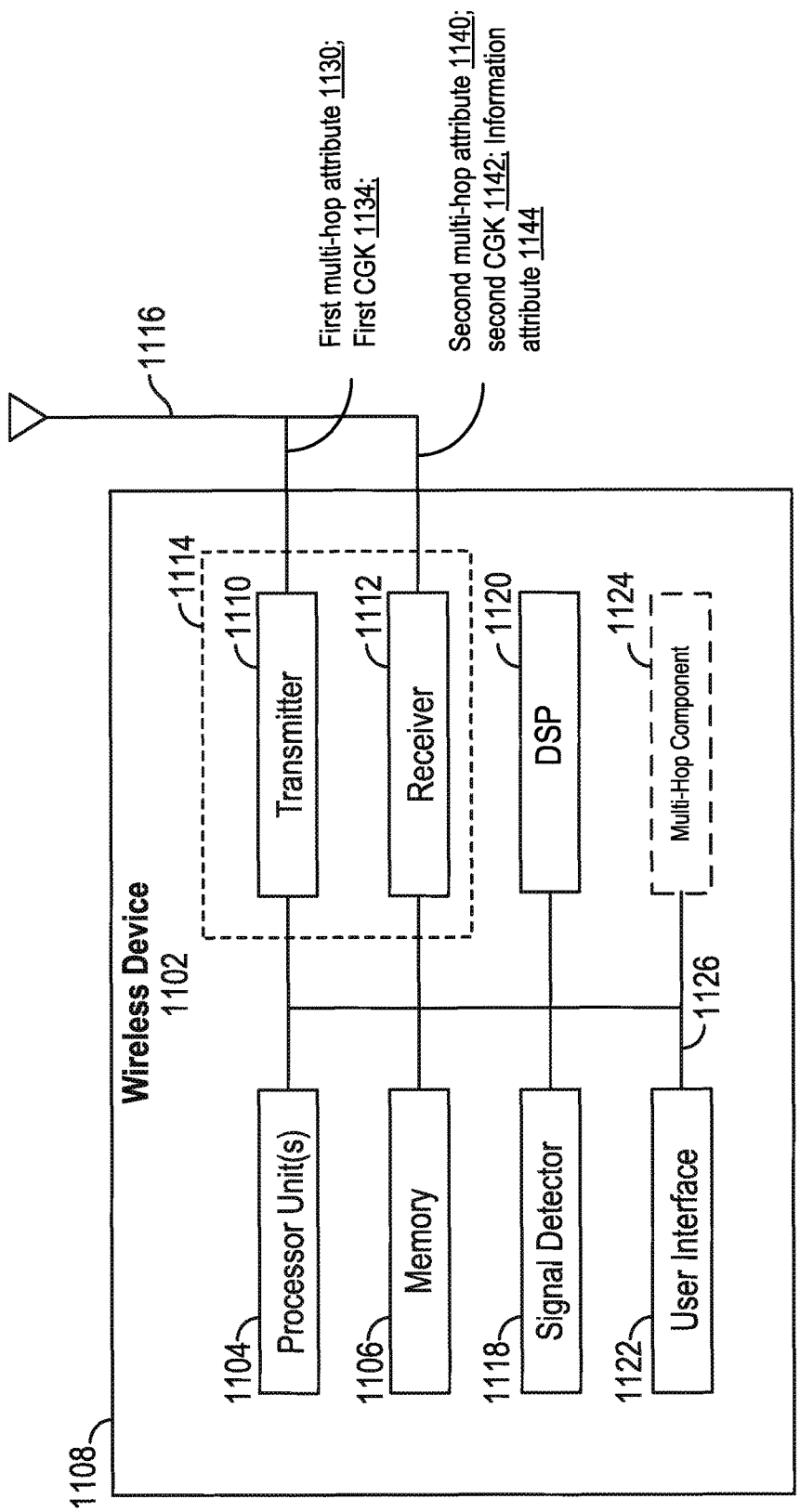
FIG. 11 shows an example functional block diagram of a wireless device that may perform NAN discovery, multi-hop routing, and multi-hop scheduling within the wireless communication system of FIG. 1.

FIG. 11 shows an example functional block diagram of a wireless device 1102 that may perform NAN discovery, multi-hop routing, and multi-hop scheduling within the wireless communication system 100 of FIG. 1. The wireless device 1102 is an example of a device that may be configured to implement the various methods described herein. For example, the wireless device 1102 may comprise one of the STAs 114, 202, 204, 206, 208, 210, 302, 304, 306, 308, 310, 702, 704, 706, 708, 710, 802, 804, 806, 808, 810, 812, 902, 904, 906, 908, 910, 912.

The wireless device 1102 may include a processor 1104, which controls operation of the wireless device 1102. The processor 1104 may also be referred to as a central processing unit (CPU). Memory 1106, which may include both read-only memory (ROM) and random access memory (RAM), may provide instructions and data to the processor 1104. A portion of the memory 1106 may also include non-volatile random access memory (NVRAM). The processor 1104 typically performs logical and arithmetic operations based on program instructions stored within the memory 1106. The instructions in the memory 1106 may be executable (by the processor 1104, for example) to implement the methods described herein.

The processor 1104 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 1102 may also include a housing 1108, and the wireless device 1002 may include a transmitter 1110 and/or a receiver 1112 to allow transmission and reception of data between the wireless device 1102 and a remote device. The transmitter 1110 and the receiver 1112 may be combined into a transceiver 1114. An antenna 1116 may be attached to the housing 1108 and electrically coupled to the transceiver 1114. The wireless device 1102 may also include multiple transmitters, multiple receivers, multiple transceivers, and/or multiple antennas.

The wireless device 1102 may also include a signal detector 1118 that may be used to detect and quantify the level of signals received by the transceiver 1114 or the receiver 1112. The signal detector 1118 may detect such signals as total energy, energy per subcarrier per symbol, power spectral density, and other signals. The wireless device 1102 may also include a DSP 1120 for use in processing signals. The DSP 1120 may be configured to generate a packet for transmission. In some aspects, the packet may comprise a physical layer convergence protocol (PLCP) data unit (PPDU).

The wireless device 1102 may further comprise a user interface 1122 in some aspects. The user interface 1122 may comprise a keypad, a microphone, a speaker, and/or a display. The user interface 1122 may include any element or component that conveys information to a user of the wireless device 1102 and/or receives input from the user.

When the wireless device 1102 is implemented as a STA (e.g., the STA 114), the wireless device 1102 may also comprise a multi-hop component 1124. The multi-hop component 1124 may be configured to determine that a multi-hop feature is enabled for a service and to transmit, based on the determination, a multi-hop attribute (e.g., a multi-hop attribute 1130) that includes an identifier provided by a publisher device and a hop count associated with the service.

The multi-hop component 1124 may be configured to determine by receiving an information attribute (e.g., an information attribute 1144) from a second wireless device. The information attribute includes an indicator that indicates whether the multi-hop feature is enabled and the identifier identifying the publisher device of the service and by determining that the multi-hop feature is enabled based on the indicator. In an aspect, the multi-hop attribute indicates an NDL attribute for the service provided by the publisher device. In another aspect, the multi-hop component 1124 may be further configured to determine to transmit the multi-hop attribute based on the received information attribute. In another aspect, the multi-hop component 1124 may be configured to determine to transmit by determining a maximum hop count associated with the service and by refraining from transmitting the multi-hop attribute if the maximum hop count is met. In this aspect, the multi-hop attribute is transmitted based on the determination to transmit. In another aspect, the multi-hop component 1124 may be configured to determine to transmit by filtering duplicate information attributes associated with the service from received information attributes, by determining a shortest path to a publisher device based on the filtered duplicate information attributes, and by determining to transmit a single multi-hop attribute for all of the filtered duplicate information attributes. In another aspect, the multi-hop component 1124 may be further configured to receive a request for association from a third wireless device based on the transmitted multi-hop attribute. In another aspect, the multi-hop component 1124 may be further configured to establish a pairwise key for communicating between the first wireless device and the third wireless device after associating with the third wireless device and to transmit a CGK (e.g., a first CGK 1134) that enables the third wireless device to encrypt and to decrypt group addressed traffic to and from other wireless devices associated with an NDL.

In another configuration, the multi-hop component 1124 may be configured to receive an information attribute (e.g., a first information attribute 1132) from a second wireless device that indicates a multi-hop service is available from a publisher device and that includes an identifier identifying the publisher device of the multi-hop service and to determine to subscribe to the multi-hop service based on the received information attribute. In aspect, the information attribute may include an indicator indicating a multi-hop feature is enabled for the multi-hop service. In another aspect, the second wireless device is the publisher device, and the information attribute is a service descriptor attribute that indicates the identifier associated with the publisher device, and the multi-hop feature is enabled for the multi-hop service. In another aspect, the second wireless device is a proxy for the publisher device, and the information attribute is a multi-hop attribute (e.g., a second multi-hop attribute 1140) that indicates the identifier associated with the publisher device and a second hop count associated with the second wireless device. In another aspect, the multi-hop attribute indicates an NDL attribute for the multi-hop service provided by the publisher device. In another aspect, the multi-hop component 1124 may be further configured to transmit an association request to the second wireless device based on the determination to subscribe to the multi-hop service. In another aspect, the multi-hop component 1124 may be further configured to establish a pairwise key for communicating between the first wireless device and the second wireless device, to receive a CGK (e.g., a second CGK 1142) that enables the first wireless device to encrypt, and to decrypt group addressed traffic to and from other wireless devices associated with an NDL.

The various components of the wireless device 1102 may be coupled together by a bus system 1126. The bus system 1126 may include a data bus, for example, as well as a power bus, a control signal bus, and a status signal bus in addition to the data bus. Components of the wireless device 1102 may be coupled together or accept or provide inputs to each other using some other mechanism.

Although a number of separate components are illustrated in FIG. 11, one or more of the components may be combined or commonly implemented. For example, the processor 1104 may be used to implement not only the functionality described above with respect to the processor 1104, but also to implement the functionality described above with respect to the signal detector 1118, the DSP 1120, the user interface 1122, and/or the multi-hop component 1124. Further, each of the components illustrated in FIG. 11 may be implemented using a plurality of separate elements.

Figure 12:
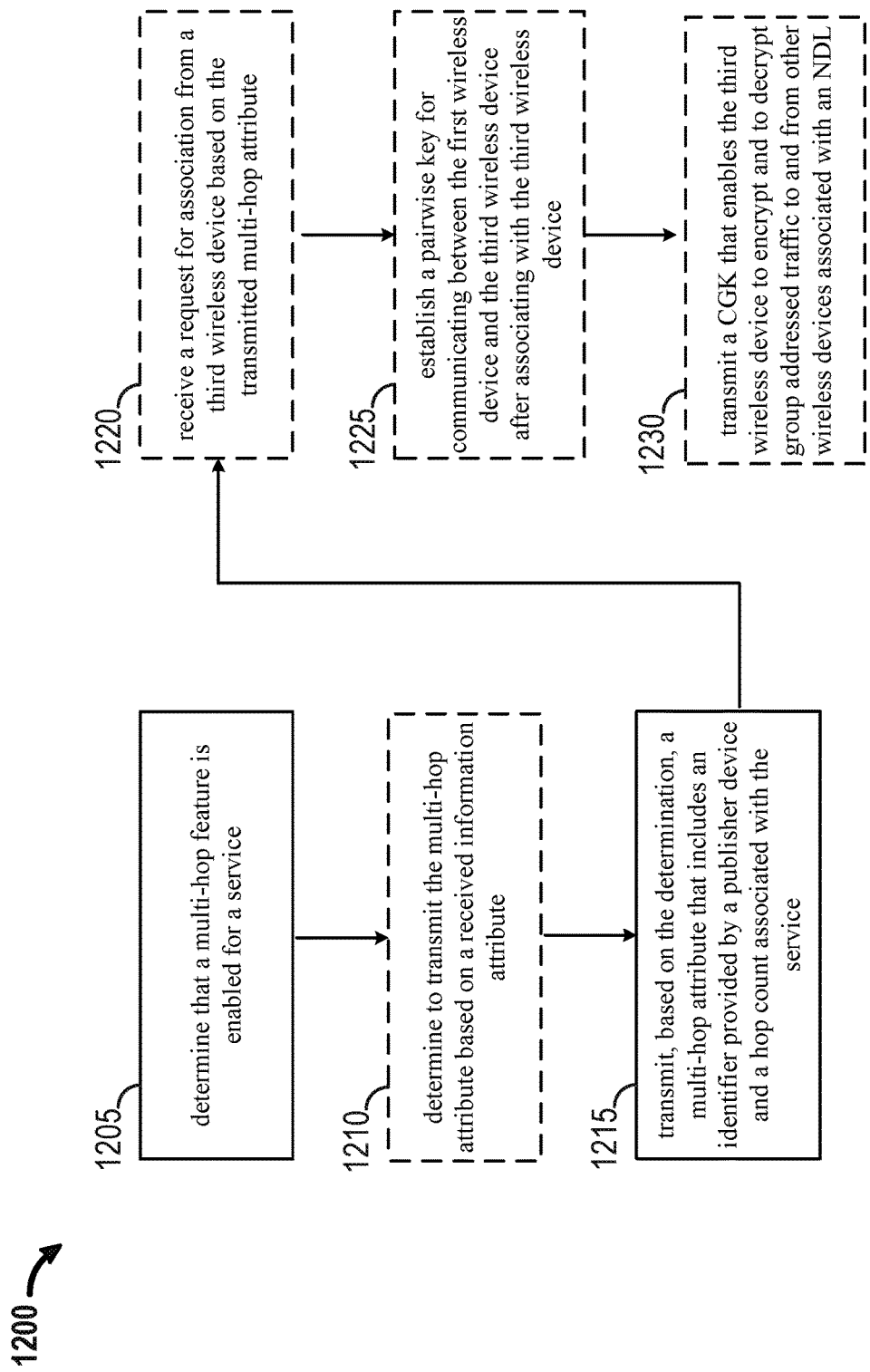
FIG. 12 is a flowchart of an exemplary method of multi-hop service discovery and routing by a proxy device.

FIG. 12 is a flowchart of an exemplary method 1200 of multi-hop service discovery and routing by a proxy device. The method 1200 may be performed using an apparatus (e.g., the STA 114, the STAs 304/304', 306/306', 308/308', or the wireless device 1102, for example). Although the method 1200 is described below with respect to the elements of wireless device 1102 of FIG. 11, other components may be used to implement one or more of the steps described herein.

At block 1205, the apparatus may determine that a multi-hop feature is enabled for a service. In one configuration, the determination that the multi-hop feature is enabled for the service is based on pre-configured information at the apparatus. In another configuration, the apparatus may determine that the multi-hop feature is enabled by receiving an information attribute from a second wireless device, in which the information attribute may include an indicator that indicates whether the multi-hop feature is enabled and the identifier may identify the publisher device of the service, and by determining that the multi-hop feature is enabled based on the indicator. In one aspect, the second wireless device may be the publisher device, and the information attribute may be a service descriptor attribute that indicates the identifier associated with the publisher device, the multi-hop feature is enabled for the service, and a maximum hop count from the publisher device for which the service is available. In another aspect, the second wireless device may be a proxy for the publisher device, and the information attribute may be a parent multi-hop attribute that indicates the identifier associated with the publisher device and a second hop count associated with the second wireless device. For example, referring to FIG. 3, the apparatus may be the STA 304. The STA 304 may determine that a multi-hop feature is enabled for a gaming service. In one aspect, the STA 304 may determine that the gaming service has the multi-hop feature based on pre-configured information. In another example, the STA 304 may determine that the multi-hop feature is enabled for the gaming service by receiving the SDA 312 from the STA 302. The SDA 312 may include an indicator set to 1 indicating that multi-hop is enabled on the gaming service and may include the MAC address of the STA 302. The SDA 312 may further indicate a maximum hop count for the gaming service. The STA 304 may determine that the multi-hop feature is enabled if the indicator is set to 1, or the multi-feature is disabled if the indicator is set to 0. In yet another example, referring to FIG. 3, the apparatus may be the STA 306. The STA 306 may determine that the multi-hop feature is enabled by receiving the first multi-hop attribute 314 from the STA 304. The first multi-hop attribute 314 may include an indicator set to 1 indicating that the gaming service is multi-hop enabled. The first multi-hop attribute 314 may further include the MAC address of the STA 302, identifying the STA 302 as the publisher of the gaming service. The first multi-hop attribute 314 may include a maximum hop count from the STA 302 and a current hop count (e.g., 1) from the STA 302.

At 1210, the apparatus may determine to transmit the multi-hop attribute based on a received information attribute. In one configuration, the apparatus may determine to transmit by determining a maximum hop count associated with the service and by refraining from transmitting the multi-hop attribute if the maximum hop count is met. In another configuration, the apparatus may determine to transmit by filtering duplicate information attributes associated with the service from received information attributes, by determining a shortest path to a publisher device based on the filtered duplicate information attributes, and by determining to transmit a single multi-hop attribute for all of the filtered duplicate information attributes. For example, referring to FIG. 3, the apparatus may be the STA 304. The STA 304 may determine to transmit the first multi-hop attribute 314 by determining that the maximum hop count associated with the gaming service is 4-hops, for example. Because the current hop count is 1, the STA 304 may determine to transmit the first multi-hop attribute 314. However, if the current hop count was 4, then the STA 304 may determine to refrain from transmitting the first multi-hop attribute 314. In another example, referring to FIG. 3, the apparatus may be the STA 306. The STA 306 may determine to transmit the third multi-hop attribute 320 by filtering duplicate first and second multi-hop attributes 314, 316, by determining a shortest path to the STA 302 (which could be either the STA 304 or the STA 308 in this case), and by determining to transmit a single multi-hop attribute—the third multi-hop attribute 320—for the both of the received first and second multi-hop attributes 314, 316. In an aspect, the STA 306 may determine that the first and second multi-hop attributes 314, 316 are for the same service based on a service identifier in the first and second multi-hop attributes 314, 316, for example.

At block 1215, the apparatus may transmit, based on the determination, a multi-hop attribute that includes an identifier provided by a publisher device and a hop count associated with the service. For example, referring to FIG. 3, the STA 304 may transmit, based on the determination the multi-hop feature is enabled for the gaming service, the first multi-hop attribute 314. The first multi-hop attribute 314 may include the MAC address of the STA 302 and a maximum hop count associated with the gaming service. In another aspect, the first multi-hop attribute 314 may include a current hop count from the STA 304 to the STA 302.

At block 1220, the apparatus may receive a request for association from a third wireless device based on the transmitted multi-hop attribute. For example, referring to FIG. 3, the STA 304 may receive a request for association from the STA 306 based on the transmitted first multi-hop attribute 314.

At block 1225, the apparatus may establish a pairwise key for communicating between the first wireless device and the third wireless device after associating with the third wireless device. For example, referring to FIG. 304, the STA 304 may establish the pairwise key by determining a password associated with the gaming service, by exchanging nonces with the STA 306, and by generating the pairwise key based on key derivation function. The key derivation function may be a hash of the password, a nonce from the STA 304, and a nonce received from the STA 306.

At block 1230, the apparatus may transmit a CGK that enables the third wireless device to encrypt and to decrypt group addressed traffic to and from other wireless devices associated with an NDL. For example, referring to FIG. 3, the STA 304 may transmit the CGK associated with the gaming service NDL to the STA 306. The CGK may enable the STA 306 to encrypt and to decrypt group-addressed traffic to and from the other STAs in the NDL.

Figure 13A:
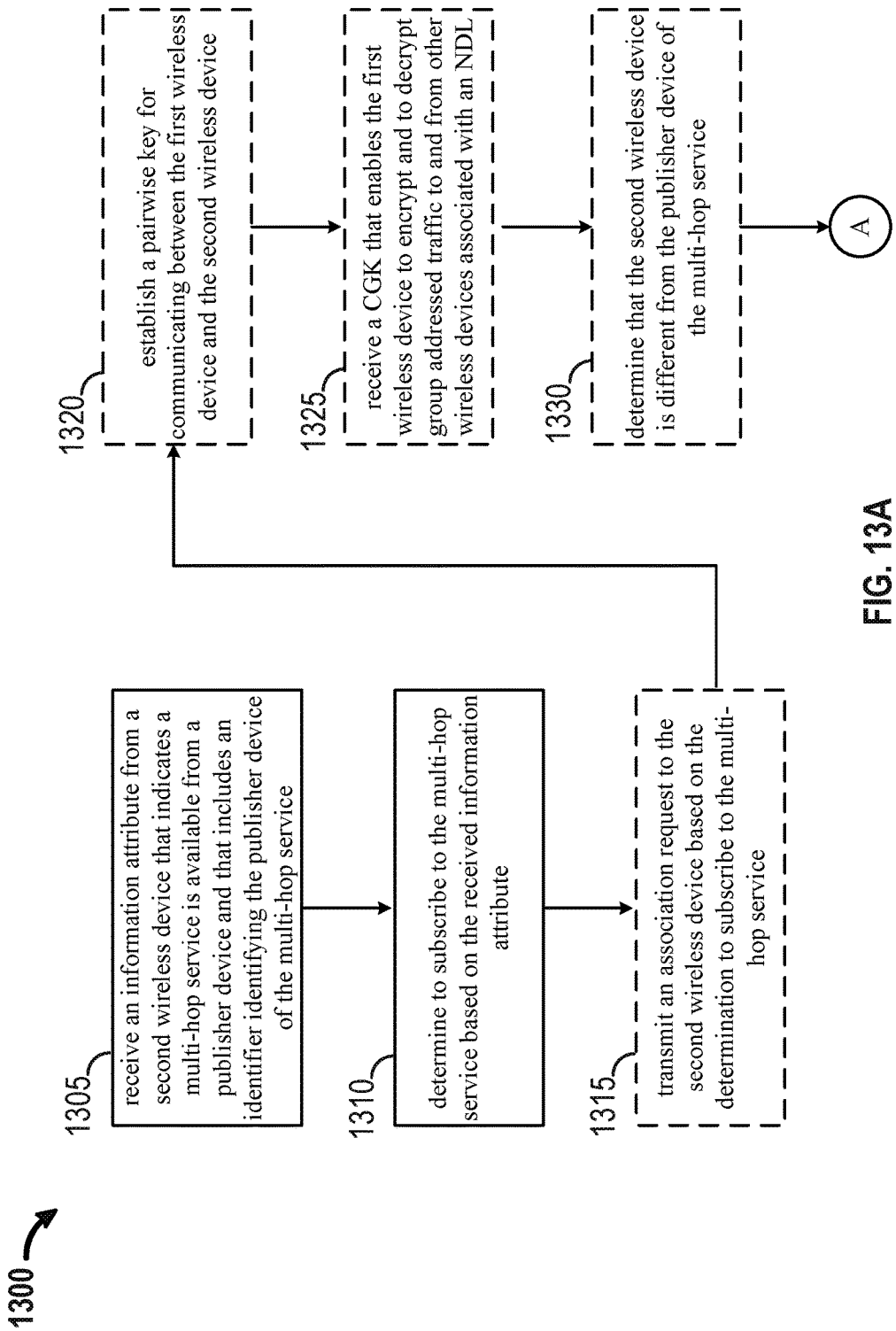
FIGS. 13A and 13B are flowcharts of exemplary methods of multi-hop service discovery and routing by a proxy device.
Figure 13B:
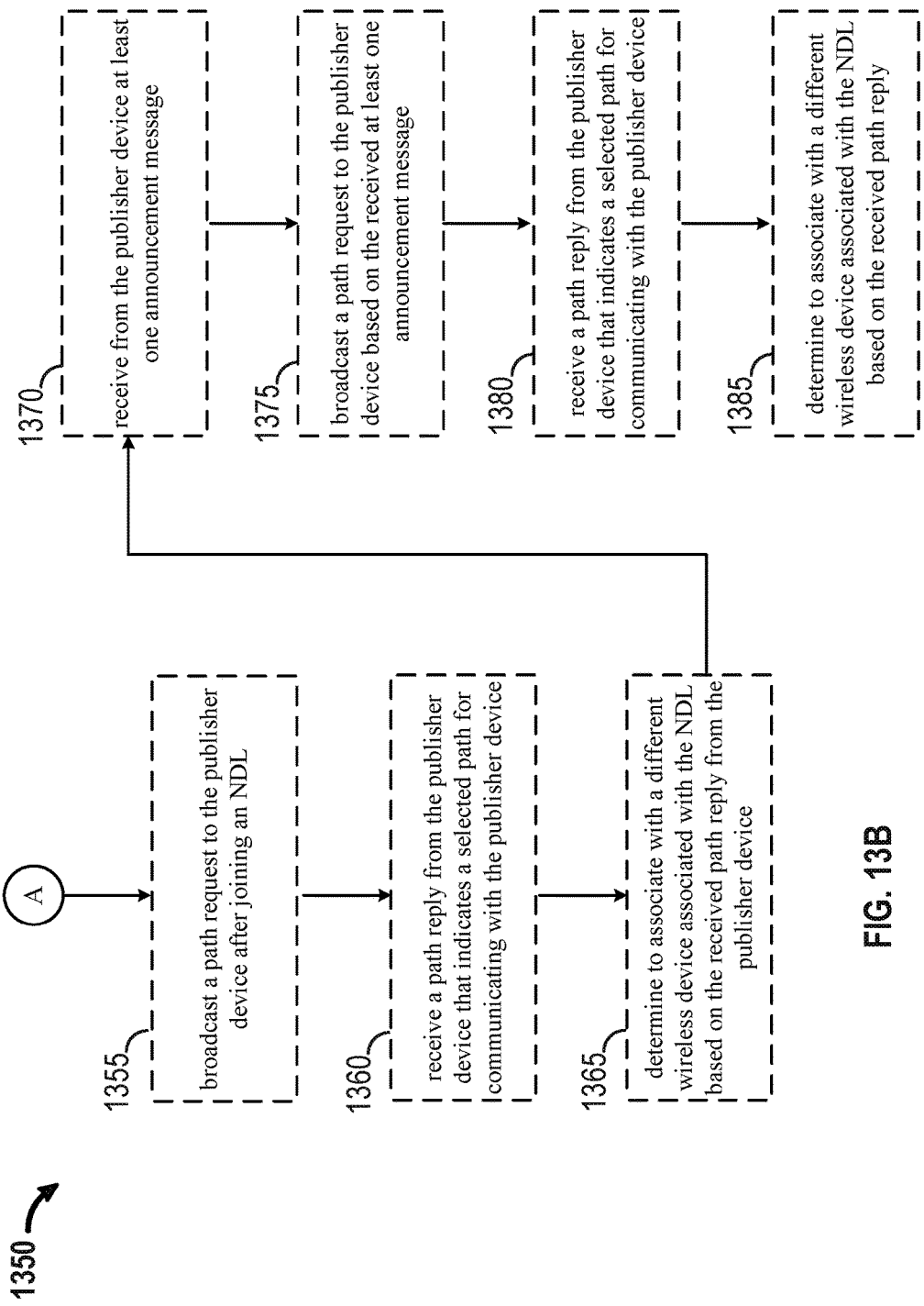

FIGS. 13A-B are flowcharts of exemplary methods 1300, 1350 of multi-hop service discovery and routing by a proxy device. The methods 1300, 1350 may be performed using an apparatus (e.g., the STA 114, the STAs 304/304', 306/306', 308/308', or the wireless device 1102, for example). Although the methods 1300, 1350 are described below with respect to the elements of wireless device 1102 of FIG. 11, other components may be used to implement one or more of the steps described herein.

Referring to FIG. 13A, at block 1305, the apparatus may receive an information attribute from a second wireless device that indicates a multi-hop service is available from a publisher device and that includes an identifier identifying the publisher device of the multi-hop service. In an aspect, the information attribute may include an indicator indicating a multi-hop feature is enabled for the multi-hop service. In another aspect, the second wireless device is the publisher device, and the information attribute may be a service descriptor attribute that indicates the identifier associated with the publisher device, the multi-hop feature is enabled for the multi-hop service, and a maximum hop count from the publisher device for which the multi-hop service is available. In another aspect, the second wireless device is a proxy for the publisher device, and the information attribute is a multi-hop attribute that indicates the identifier associated with the publisher device and a second hop count associated with the second wireless device. In this aspect, the multi-hop attribute may point to an NDL attribute. The NDL attribute may be transmitted with the multi-hop attribute within the same service discovery frame. In another aspect, the information attribute may be transmitted during a discovery window of a NAN, and the apparatus, the second wireless device, and the publisher device may be members of a same NAN cluster and time synchronized based on a NAN synchronization mechanism. In one example, referring to FIG. 3, the apparatus may be the STA 304. The STA 304 may receive the SDA 312 from the STA 302 that indicates the multi-hop gaming service is available from the STA 302 (the publisher device) and the SDA 312 may include the MAC address of the STA 302. STA 306. In another example, the apparatus may be the STA 306. The STA 306 may receive the first multi-hop attribute 314 from the STA 304. The first multi-hop attribute 314 may indicate that the multi-hop gaming service is available from the STA 302. The first multi-hop attribute 314 may include the MAC address of the STA 302.

At block 1310, the apparatus may determine to subscribe to the multi-hop service based on the received information attribute. In one configuration, the apparatus may determine to subscribe by determining the multi-hop service supports the multi-hop feature and by determining that the apparatus is within a hop count indicated in the information attribute. For example, referring to FIG. 3, the STA 304 may determine to subscribe to the multi-hop gaming service based on the received SDA 312. The STA 304 may determine that the gaming service supports multi-hop and may determine that the STA 304 is within the maximum hop count of the gaming service. In another example, the STA 306 may determine to subscribe to the multi-hop gaming service based on the received first multi-hop attribute 314. The STA 306 may determine that the gaming service supports multi-hop and may determine that the STA 306 is within the maximum hop count of the multi-hop gaming service.

At block 1315, the apparatus may transmit an association request to the second wireless device based on the determination to subscribe to the multi-hop service. For example, referring to FIG. 3, the STA 306 may transmit an association request to the STA 304 based on the determination to subscribe to the multi-hop gaming service.

At block 1320, the apparatus may establish a pairwise key for communicating between the apparatus and the second wireless device. For example, referring to FIG. 3, the STA 306 may exchange nonces with the STA 304 and derive the pairwise key based on the exchanged nonces.

At block 1325, the apparatus may receive a CGK that enables the first wireless device to encrypt and to decrypt group addressed traffic to and from other wireless devices associated with an NDL. For example, referring to FIG. 3, the STA 306 may receive the CGK for the gaming service NDL that enables the apparatus to encrypt and decrypt group-addressed traffic to and from other wireless devices (e.g., the STAs 302, 308) associated with the gaming service NDL.

At block 1330, the apparatus may determine that the second wireless device is different from the publisher device of the multi-hop service. For example, referring to FIG. 3, the STA 306 may determine that the STA 304 is not the publisher device by determining the MAC address of the publisher device as indicated in the first multi-hop attribute 314 is different from the MAC address of the STA 304.

Alternatively, the STA 306 may determine that the STA 304 is not the publisher because the STA 304 transmitted a multi-hop attribute rather than a service descriptor attribute.

Referring to FIG. 13B, at block 1355, the apparatus may broadcast a path request to the publisher device after joining an NDL. For example, referring to FIG. 6, the apparatus may be the STA 318'. The STA 318' may broadcast the PREQ 322 to the STA 302' after joining the NDL associated with the multi-hop gaming service.

At block 1360, the apparatus may receive a path reply from the publisher device that indicates a selected path for communicating with the publisher device. For example, referring to FIG. 6, the STA 318' may receive the PREP 326 from the STA 302' that indicates a selected path for communicating with the STA 302'. The PREP 326 may include a cumulative link quality matrix that indicates that the path to the STA 302' via the STA 324 is better than the path via the STA 306'.

At block 1365, the apparatus may determine to associate with a different wireless device associated with the NDL based on the received path reply from the publisher device. For example, referring to FIG. 6, the STA 318' may determine to associate with the STA 324 by comparing a current cumulative link quality to the STA 302' with a new cumulative link quality matrix in included in the PREP 326. If the difference between the new cumulative link quality matrix and the current cumulative link quality matrix is greater than a threshold (e.g., shorter in number of hops by more than a threshold or a lower packet error rate by more than threshold), then the STA 318' may determine to associate with the STA 324.

At block 1370, the apparatus may receive from the publisher at least one announcement message. For example, referring to FIG. 6, the apparatus may be the STA 310'. The STA 310' may receive the RANN 328 periodically transmitted by the STA 302. The STA 310' may receive the RANN 328 via the STA 324 and the STA 308'.

At block 1375, the apparatus may broadcast a path request to the publisher device based on the received at least one announcement message. For example, referring to FIG. 6, the STA 310' may broadcast the PREQ 330 to the STA 302' based on the received RANN 328.

At block 1380, the apparatus may receive a path reply from the publisher device that indicates a selected path for communicating with the publisher device. For example, referring to FIG. 6, the STA 310' may receive the PREP 322 from the STA 302'. The PREP 322 may indicate a selected path for communicating with the STA 302'. In an aspect, the PREP 322 may indicate the selected path by indicating a cumulative link quality matrix to the STA 310'.

At block 1385, the apparatus may determine to associate with a different wireless device associated with the NDL based on the received path reply. For example, referring to FIG. 6, the STA 310' may determine that the path to the STA 302' via the STA 324 is no longer the optimal path because the current link quality matrix via the STA 324 is poorer than the cumulative link quality matrix via the STA 308' by more a threshold. For example, the threshold may be 5, the current link quality matrix may be 25, and the new link quality matrix indicated in the PREP 322 may be 15.

Figure 14:
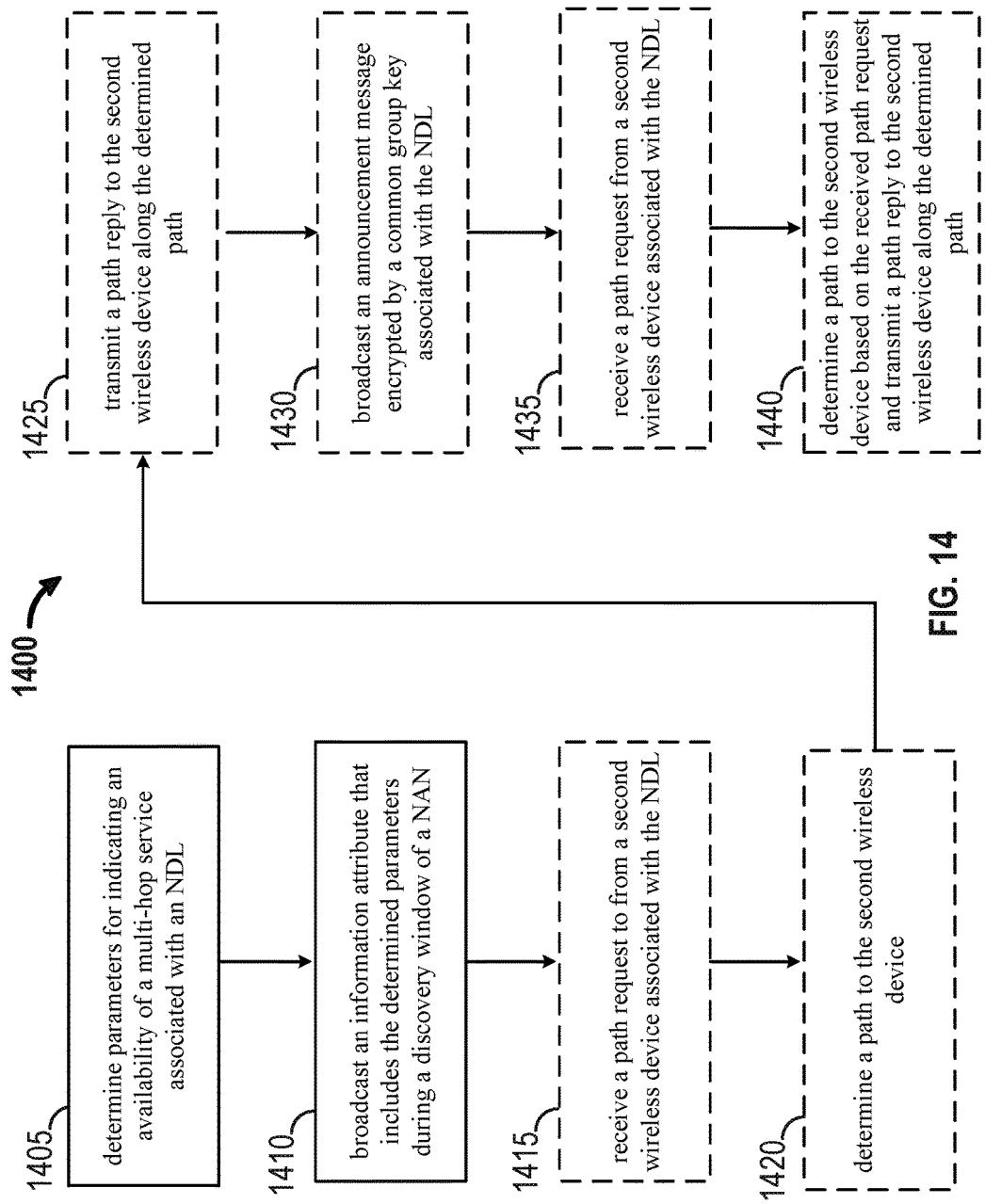
FIG. 14 is a flowchart of an exemplary method of multi-hop service discovery and routing by a publisher device.

FIG. 14 is a flowchart of an exemplary method 1400 of multi-hop service discovery and routing by a publisher device. The method 1400 may be performed using an apparatus (e.g., the STA 114, the STA 302/302', or the wireless device 1102, for example). Although the method 1400 is described below with respect to the elements of wireless device 1102 of FIG. 11, other components may be used to implement one or more of the steps described herein.

At block 1405, the apparatus may determine parameters for indicating an availability of a multi-hop service associated with an NDL. For example, referring to FIG. 3, the apparatus may be the STA 302. The STA 302 may determine whether a service supports multi-hop. The STA 302 may determine a maximum hop count for the multi-hop service. The STA 302 may determine to the MAC address of the STA 302. The STA 302 may determine quality of service requirements for the multi-hop service. The STA 302 may determine other parameters associated with a service descriptor attribute.

At block 1410, the apparatus may broadcast an information attribute that includes the determined parameters during a discovery window of a NAN. For example, referring to FIG. 3, the STA 302 may broadcast the SDA 312 that includes the determined parameters (e.g., the MAC address and the maximum hop count of the multi-hop service).

At block 1415, the apparatus may receive a path request to from a second wireless device associated with the NDL. For example, referring to FIG. 6, the STA 302 may receive the PREQ 322 from the STA 318' associated with the gaming service NDL.

At block 1420, the apparatus may determine a path to the second wireless device. For example, referring to FIG. 6, the PREQ 322 from the STA 318' (the second wireless device) may traverse via different nodes. The STA 302' may receive one PREQ 322 via the STAs 306', 304'. The STA 302' may receive another PREQ 322 via the STA 324. The PREQ 322 via the STA 304' may include a first cumulative link quality matrix, and the PREQ 322 via the STA 324 may include a second cumulative link quality matrix. The STA 302' may determine that the second cumulative link quality matrix is better than the first cumulative link quality matrix. For example, the second cumulative link quality matrix may have less hops than the first link quality matrix and/or the packet error rate of the second cumulative link quality matrix may be lower than the first cumulative link quality matrix. As such, the STA 302' may determine that the path via the STA 324 is the better path.

At block 1425, the apparatus may transmit a path reply to the second wireless device along the determined path. For example, referring to FIG. 6, the STA 302' may transmit the PREP 326 to the STA 318' along the determined path via the STA 324.

At block 1430, the apparatus may broadcast an announcement message encrypted by a common group key associated with the NDL. For example, referring to FIG. 6, the STA 302' may periodically broadcast the RANN 328, which may be encrypted by the CGK associated with the gaming service NDL.

At block 1435, the apparatus may receive a path request from a second wireless device associated with the NDL. For example, referring to FIG. 6, the STA 302' may receive the PREQ 330 from the STA 310'.

At block 1440, the apparatus may determine a path to the second wireless device based on the received path request and transmit a path reply to the second wireless device along the determined path. For example, referring to FIG. 6, the STA 302' may determine a path to the STA 310' based on the received PREQ 330. The STA 302' may receive the PREQ 330 via the STA 308' and via the STA 324'. The STA 302' may determine that the cumulative link quality matrix of the PREQ 330 received via the STA 308' is better than the cumulative link quality matrix of the PREQ 330 received via the STA 324. Accordingly, the STA 302' may determine that the best path to the STA 310' is via the STA 308'.

Figure 15:
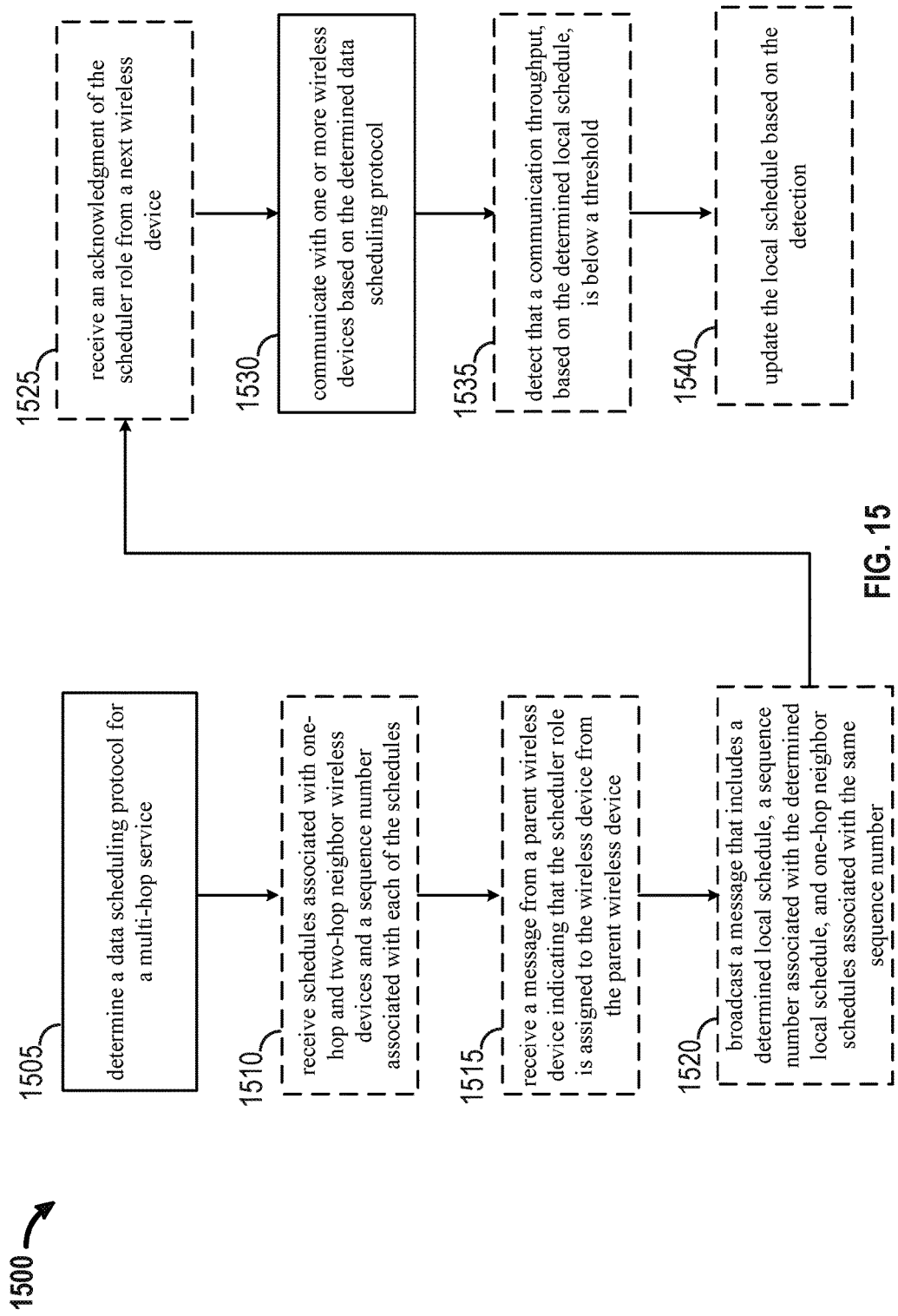
FIG. 15 is a flowchart of an exemplary method of multi-hop scheduling.

FIG. 15 is a flowchart of an exemplary method 1500 of multi-hop scheduling. The method 1500 may be performed using an apparatus (e.g., the STA 114, the STAs 702, 704, 706, 708, 710, 802, 804, 806, 808, 810, 812, 902, 904, 906, 908, 910, 912, or the wireless device 1102, for example). Although the method 1500 is described below with respect to the elements of wireless device 1102 of FIG. 11, other components may be used to implement one or more of the steps described herein.

At block 1505, the apparatus determine a data scheduling protocol for a multi-hop service.

In one configuration, the RTS/CTS protocol may be used. In this configuration, the apparatus may determine the data scheduling protocol by determining an NDL schedule and by determining to exchange RTS and CTS messages before communicating with the one or more wireless devices according to the determined NDL schedule. For example, referring to FIG. 7, the apparatus may be the STA 704. The apparatus may determine the data scheduling protocol by determining an NDL schedule for transmitting and/or receiving data. The apparatus may use an RTS/CTS protocol for determining when to transmit the NDL data. For example, when the STA 704 has data to transmit, the STA 704 may transmit the RTS message 714 and wait for the CTS message 716 before transmitting the data 712. The STAs 706, 708, having received the CTS message 716 may refrain from transmitting to keep the medium available for the STA 704 to transmit.

In another configuration, the coordinated scheduling schemes of per link or per hop schedule allocation may be used. In one example, referring to FIG. 8, the apparatus may be the STA 802. The STA 802 may select per link scheduling based on the QoS and/or throughput requirements of the multi-hop gaming service. The STA 802 may determine that the STA 802 is the publisher device, and therefore, has the scheduler role upon initiating the scheduling algorithm. The STA 802 may perform the per link scheduling algorithm by determining that the STA 802 has a local network degree of 2, and therefore, needs 2 base time blocks for communication. The STA 802 may determine a sequence number to be associated with the instance of the scheduling algorithm. In an aspect, an instance of the scheduling algorithm may extend until all devices associated with the NDL have performed the scheduling algorithm once. The STA 802 may determine the local schedule for the STA 802 based on the 2 time blocks needed. The STA 802 may select channel 1 on time blocks 1 and 2. The STA 802 may determine the network degree of the STAs 804, 810 (the child wireless devices). The STA 804 has a network degree of 3, and the STA 810 has a network degree of 1. The STA 802 may assign the scheduler role to the STA 804 because the STA 804 has a higher network degree than the STA 810.

At block 1510, the apparatus may receive schedules associated with one-hop and two-hop neighbor wireless devices and a sequence number associated with each of the schedules. In one example, referring to FIG. 8, the STA 804 may receive the first message 814 from the STA 802, and the first message 814 may include a local schedule of the STA 802, which is a 1-hop neighbor of the STA 804. In this example, the STA 804 may determine its local schedule based on the local schedule received from the STA 802 that has the same sequence number. In another example, when the STA 804 transmits the fifth message 822, the STA 802 may receive the fifth message 822 from the STA 804. The fifth message 822 may include the local schedule from the STA 804 (a 1-hop neighbor from the STA 802) and the local schedules from the STAs 806, 810 (2-hop neighbors from the STA 802). However, the STA 802 may not use the local schedules from the STAs 804, 806, 810 when it initiates a new scheduling algorithm because the local schedules may not have the same sequence number because the STA 802 may be initiating a new scheduling algorithm.

At block 1515, the apparatus may receive a message from a parent wireless device indicating that the scheduler role is assigned to the apparatus from the parent wireless device. For example, referring to FIG. 8, the STA 804 (the apparatus) may receive the first message 814 from the STA 802 (the parent wireless device) indicating that the scheduler role is assigned to the STA 804.

At block 1520, the apparatus may broadcast a message that includes a determined local schedule, a sequence number associated with the determined local schedule, and one-hop neighbor schedules associated with the same sequence number. In one example, referring to FIG. 8, the apparatus may be the STA 802. The STA 802 may broadcast the first message 814 that includes the determined local schedule of the STA 802, a sequence number 1 associated with the determined local schedule, and an indication that the scheduler role is being assigned to the STA 804.

In another example, the apparatus may be the STA 804. The STA 804 may broadcast the second message 816 that includes the determined local schedule of the STA 804, the sequence number 1 associated with the determined local schedule, and the local schedule of the STA 802, which is a 1-hop neighbor from the STA 804. The second message 816 may include the MAC address of the STA 806 in a next hop field or next wireless device field to indicate that the STA 806 is the next wireless device assigned the scheduler role.

At block 1525, the apparatus may receive an acknowledgment of the scheduler role from a next wireless device. For example, referring to FIG. 8, the STA 804 may receive an acknowledgment from the STA 806 indicating reception of the second message 816. The acknowledgment may indicate that the STA 806 acknowledges that the STA 806 has been assigned the scheduler role.

In an aspect, all child wireless devices in the NDL may have an opportunity to perform the scheduling algorithm, and the scheduler role may be passed back to the parent node. In one example, the STA 804 may receive an assignment of the scheduler role back from the STA 806 (the child wireless device). The STA 804 may determine not to assign the scheduler role to the STA 810 because the STA 810 has a network degree of 1. Accordingly, the STA 804 may return the scheduler role to the STA 802 (the parent wireless device of the STA 804) via the fifth message 822 because all child wireless devices of the STA 804 have been considered for assignment. The STA 802, upon receiving the fifth message 822, may end the per link scheduling algorithm because the STA 802 does not have another wireless device to assign the scheduler role and the STA 802 initiated the per links scheduling algorithm as the publisher.

At block 1530, the apparatus may communicate with one or more wireless devices based on the determined data scheduling protocol. For example, referring to FIG. 8, after the STAs 802, 804, 806, 808, 810, 812 have been given an opportunity to perform the scheduling algorithm, and the scheduler role has been returned to the STA 802, the STA 802 may communicate with one or more of the STAs 804, 806, 808, 810, 812 based on the scheduling protocol as determined using the per link scheduling algorithm.

In another configuration, an NDL schedule may not utilize a token for scheduler role assignment. In this configuration, each wireless device may simultaneously or independently initiate a per link or per hop scheduling algorithm. In this configuration, all of the wireless devices in the NDL may be required to uniformly use per link or per hop scheduling. In this configuration, the wireless device may select per hop scheduling allocation for example. The wireless device may determine the local schedule associated with the wireless device for communicating with other wireless devices in the NDL. The wireless device may broadcast the determined local schedule. In an aspect, the broadcasted local schedule may be encrypted using a CGK. In an aspect, the wireless device may also receive a broadcasted schedule from a parent wireless device. In this aspect, the local schedule for the wireless device may be based on the broadcasted schedule from the parent wireless device.

In this configuration, at block 1535, the apparatus may detect that a communication throughput, based on the determined local schedule, is below a threshold. For example, the wireless device may detect that a communication throughput is below a threshold by determining the throughput and by determining if the throughput is above or below a threshold. At block 1540, the apparatus may update the local schedule based on the detection. For example, if the communication throughput is below a threshold, then the wireless device may adjust transmissions parameters (e.g., a different time block and/or a different channel/frequency). In another example, if the communication throughput is at or above a threshold, then the wireless device may not adjust the local schedule.

Figure 16:
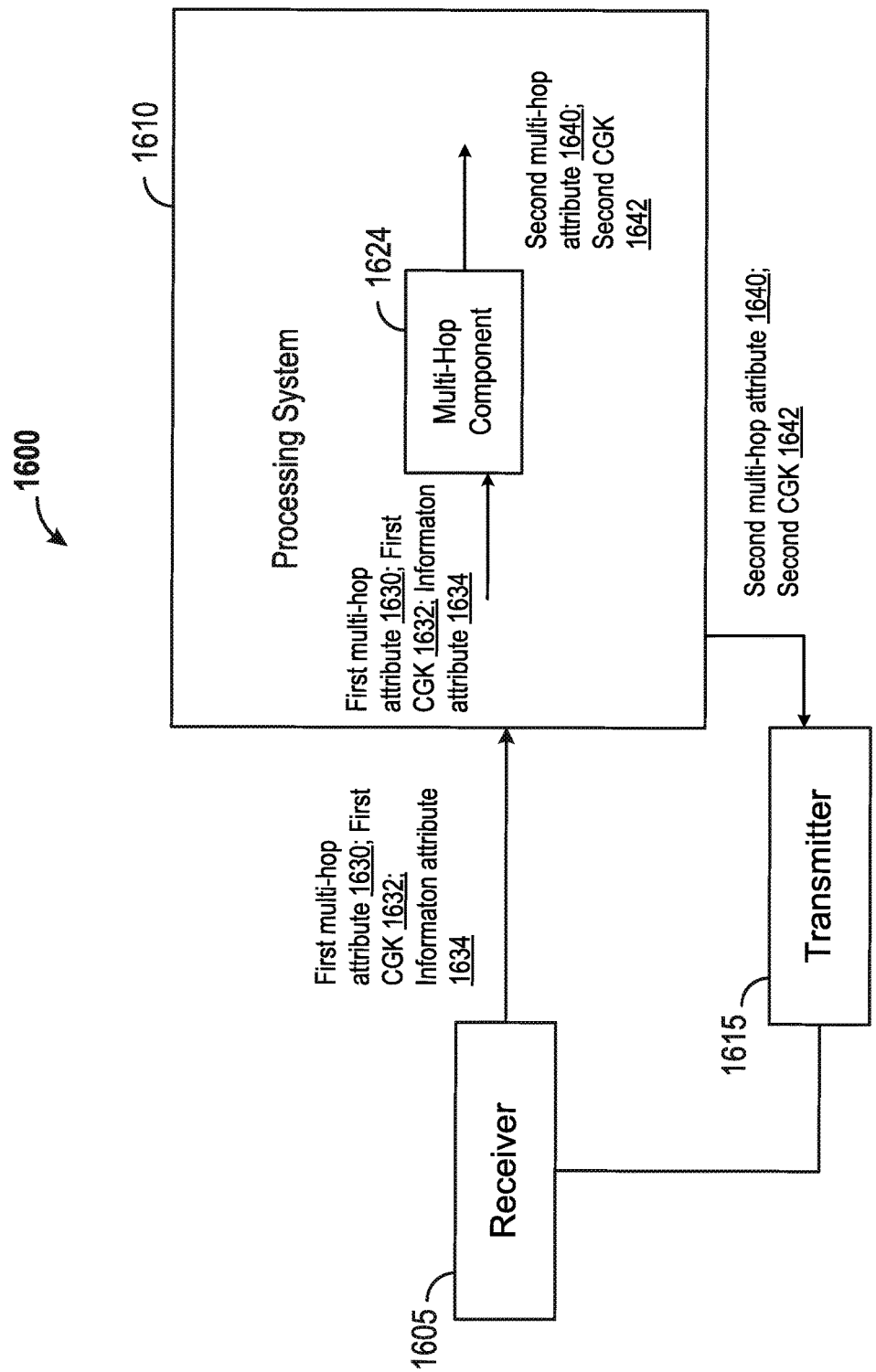
FIG. 16 is a functional block diagram of an example wireless communication device that performs NAN discovery, multi-hop routing, and multi-hop scheduling.

FIG. 16 is a functional block diagram of an example wireless communication device 1600 that performs NAN discovery, multi-hop routing, and multi-hop scheduling. The wireless communication device 1600 may include a receiver 1605, a processing system 1610, and a transmitter 1615. The processing system 1610 may include a multi-hop component 1624. In one configuration, the processing system 1610 and/or the multi-hop component 1624 may be configured to determine that a multi-hop feature is enabled for a service. The transmitter 1615, the processing system 1610, and/or the multi-hop component 1624 may be configured to transmit, based on the determination, a multi-hop attribute (e.g., a second multi-hope attribute 1640) that includes an identifier provided by a publisher device and a hop count associated with the service. The processing system 1610 and/or the multi-hop component 1624 may be configured to determine by receiving an information attribute (e.g., an information attribute 1634) from a second wireless device, in which the information attribute includes an indicator that indicates whether the multi-hop feature is enabled and the identifier identifying the publisher device of the service, and by determining that the multi-hop feature is enabled based on the indicator. In an aspect, the multi-hop attribute indicates an NDL attribute for the service provided by the publisher device. In another aspect, the processing system 1610 and/or the multi-hop component 1624 may be further configured to determine to transmit the multi-hop attribute based on the received information attribute. In another aspect, the processing system 1610 and/or the multi-hop component 1624 may be configured to determine to transmit by determining a maximum hop count associated with the service and by refraining from transmitting the multi-hop attribute if the maximum hop count is met. The multi-hop attribute is transmitted based on the determination to transmit. In another aspect, the processing system 1610 and/or the multi-hop component 1624 may be configured to determine to transmit by filtering duplicate information attributes associated with the service from received information attributes, by determining a shortest path to a publisher device based on the filtered duplicate information attributes, and by determining to transmit a single multi-hop attribute for all of the filtered duplicate information attributes. In another aspect, the receiver 1605, the processing system 1610, and/or the multi-hop component 1624 may be further configured to receive a request for association from a third wireless device based on the transmitted multi-hop attribute. In another aspect, the processing system 1610 and/or the multi-hop component 1624 may be further configured to establish a pairwise key for communicating between the first wireless device and the third wireless device after associating with the third wireless device and to transmit a CGK (e.g., a second CGK 1642) that enables the third wireless device to encrypt and to decrypt group addressed traffic to and from other wireless devices associated with an NDL.

In another configuration, the receiver 1605, the processing system 1610 and/or the multi-hop component 1624 may be configured to receive an information attribute (e.g., the information attribute 1634) from a second wireless device that indicates a multi-hop service is available from a publisher device and that includes an identifier identifying the publisher device of the multi-hop service. The processing system 1610 and/or the multi-hop component 1624 may be configured to determine to subscribe to the multi-hop service based on the received information attribute. In aspect, the information attribute may include an indicator indicating a multi-hop feature is enabled for the multi-hop service. In another aspect, the second wireless device is the publisher device, and the information attribute is a service descriptor attribute that indicates the identifier associated with the publisher device, and the multi-hop feature is enabled for the multi-hop service. In another aspect, the second wireless device is a proxy for the publisher device, and the information attribute is a multi-hop attribute (e.g., a first multi-hop attribute 1630) that indicates the identifier associated with the publisher device and a second hop count associated with the second wireless device. In another aspect, the multi-hop attribute indicates an NDL attribute for the multi-hop service provided by the publisher device. In another aspect, the transmitter 1615, the processing system 1610, and/or the multi-hop component 1624 may be further configured to transmit an association request to the second wireless device based on the determination to subscribe to the multi-hop service. In another aspect, the processing system 1610 and/or the multi-hop component 1624 may be further configured to establish a pairwise key for communicating between the first wireless device and the second wireless device, to receive a CGK (e.g., a first CGK 1632) that enables the first wireless device to encrypt, and to decrypt group addressed traffic to and from other wireless devices associated with an NDL.

The receiver 1605, the processing system 1610, the multi-hop component 1624, and/or the transmitter 1615 may be configured to perform one or more functions discussed above with respect to FIGS. 1-15. The receiver 1605 may correspond to the receiver 1112. The processing system 1610 may correspond to the processor 1104. The transmitter 1615 may correspond to the transmitter 1110. The multi-hop component 1624 may correspond to the multi-hop component 124, and/or the multi-hop component 1124.

In one configuration, the wireless communication device 1600 may include means for determining that a multi-hop feature is enabled for a service and means for transmitting, based on the determination, a multi-hop attribute that includes an identifier provided by a publisher device and a hop count associated with the service. The means for determining may be configured to receive an information attribute from a second wireless device. The information attribute may include an indicator that indicates whether the multi-hop feature is enabled and the identifier identifying the publisher device of the service and by determining that the multi-hop feature is enabled based on the indicator. In an aspect, the multi-hop attribute indicates an NDL attribute for the service provided by the publisher device. In another aspect, the wireless communication device 1600 may include means for determining to transmit the multi-hop attribute based on the received information attribute. In another aspect, the means for determining to transmit may be configured to determine a maximum hop count associated with the service and to refrain from transmitting the multi-hop attribute if the maximum hop count is met. The multi-hop attribute is transmitted based on the determination to transmit. In another aspect, the means for determining to transmit may be configured to filter duplicate information attributes associated with the service from received information attributes, to determine a shortest path to a publisher device based on the filtered duplicate information attributes, and to determine to transmit a single multi-hop attribute for all of the filtered duplicate information attributes. In another aspect, the wireless communication device 1600 may further include means for receiving a request for association from a third wireless device based on the transmitted multi-hop attribute. In another aspect, the wireless communication device 1600 may further include means for establishing a pairwise key for communicating between the first wireless device and the third wireless device after associating with the third wireless device and means for transmitting a CGK that enables the third wireless device to encrypt and to decrypt group addressed traffic to and from other wireless devices associated with an NDL.

In another configuration, the wireless communication device 1600 may include means for receiving an information attribute from a second wireless device that indicates a multi-hop service is available from a publisher device and that includes an identifier identifying the publisher device of the multi-hop service and means for determining to subscribe to the multi-hop service based on the received information attribute. In aspect, the information attribute may include an indicator indicating a multi-hop feature is enabled for the multi-hop service. In another aspect, the second wireless device is the publisher device, and the information attribute is a service descriptor attribute that indicates the identifier associated with the publisher device, and the multi-hop feature is enabled for the multi-hop service. In another aspect, the second wireless device is a proxy for the publisher device, and the information attribute is a multi-hop attribute that indicates the identifier associated with the publisher device and a second hop count associated with the second wireless device. In another aspect, the multi-hop attribute indicates an NDL attribute for the multi-hop service provided by the publisher device. In another aspect, the wireless communication device 1600 may further include means for transmitting an association request to the second wireless device based on the determination to subscribe to the multi-hop service. In another aspect, the wireless communication device 1600 may be further include means for establishing a pairwise key for communicating between the first wireless device and the second wireless device, means for receiving a CGK that enables the first wireless device to encrypt and to decrypt group addressed traffic to and from other wireless devices associated with an NDL.

For example, means for performing the aforementioned functions may include the receiver 1605, the transmitter 1615, the processing system 1610, and or the multi-hop component 1624.

The various operations of methods described above may be performed by any suitable means capable of performing the operations, such as various hardware and/or software component(s), circuits, and/or component(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an ASIC, a FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by a first wireless device, comprising:
    determining that a multi-hop feature is enabled for a service;
    transmitting, based on the determination, a multi-hop attribute that includes an identifier provided by a publisher device and a shortest hop count from the first wireless device to the publisher device associated with the services;
    determining to transmit the multi-hop attribute based on the received information attribute; and
    wherein the determining comprises:
        receiving an information attribute from a second wireless device, wherein the information attribute includes an indicator that indicates whether the multi-hop feature is enabled and the identifier identifying the publisher device of the service; and
        determining that the multi-hop feature is enabled based on the indicator,
    wherein the determining to transmit comprises:
        determining a maximum hop count associated with the service; and
        refraining from transmitting the multi-hop attribute if the maximum hop count is met, wherein the multi-hop attribute is transmitted based on the determination to transmit,
    wherein the determining to transmit comprises:
        filtering duplicate information attributes associated with the service from received information attributes;
        determining a best path to a publisher device based on the filtered duplicate information attributes; and
        determining to transmit a single multi-hop attribute for all of the filtered duplicate information attributes.

2. The method of claim 1, wherein the multi-hop attribute indicates a neighbor awareness networking (NAN) data link (NDL) attribute for the service provided by the publisher device.

3. A method of wireless communication by a first wireless device, comprising:
    determining that a multi-hop feature is enabled for a service;
    transmitting, based on the determination, a multi-hop attribute that includes an identifier provided by a publisher device and a shortest hop count from the first wireless device to the publisher device associated with the service;
    receiving a request to join from a third wireless device based on the transmitted multi-hop attribute;
    establishing a pairwise key for communicating between the first wireless device and the third wireless device after receiving the request to join; and transmitting a common group key (CGK) that enables the third wireless device to encrypt and to decrypt group addressed traffic to and from other wireless devices associated with a neighbor awareness networking (NAN) data link (NDL) of the first wireless device.

4. A method of wireless communication by a first wireless device, comprising:
receiving an information attribute from a second wireless device that indicates a multi-hop service is available from a publisher device and that includes an identifier identifying the publisher device of the multi-hop service and a shortest hop count from the second wireless device to the publisher device;
determining to subscribe to the multi-hop service based on the received information attribute;
transmitting a request to join to the second wireless device based on the determination to subscribe to the multi-hop service;
establishing a pairwise key for communicating between the first wireless device and the second wireless device after transmitting the request to join; and
receiving a common group key (CGK) that enables the first wireless device to encrypt and to decrypt group addressed traffic to and from other wireless devices associated with a neighbor awareness networking (NAN) data link (NDL) of the second wireless device.

5. The method of claim 4, wherein the information attribute includes an indicator indicating a multi-hop feature is enabled for the multi-hop service.

6. The method of claim 5, wherein the second wireless device is the publisher device, and wherein the information attribute is a service descriptor attribute that indicates the identifier associated with the publisher device, and the multi-hop feature is enabled for the multi-hop service.

7. The method of claim 5, wherein the second wireless device is a proxy for the publisher device, and wherein the information attribute is a multi-hop attribute that indicates the identifier associated with the publisher device and the shortest hop count from the second wireless device to the publisher device.

8. The method of claim 7, wherein the multi-hop attribute indicates a neighbor awareness networking (NAN) data link (NDL) attribute for the multi-hop service provided by the publisher device.

9. A first wireless device for wireless communication, comprising:
a memory;
at least one processor coupled to the memory and configured to:
determine that a multi-hop feature is enabled for a service; and
transmit, based on the determination, a multi-hop attribute that includes an identifier provided by a publisher device and a shortest hop count from the first wireless device to the publisher device associated with the service; and
wherein the at least one processor is configured to determine by:
receiving an information attribute from a second wireless device, wherein the information attribute includes an indicator that indicates whether the multi-hop feature is enabled and the identifier identifying the publisher device of the service; and
determining that the multi-hop feature is enabled based on the indicator;
wherein the at least one processor is further configured to determine to transmit the multi-hop attribute based on the received information attribute;
wherein the at least one processor is configured to determine to transmit by:
determining a maximum hop count associated with the service; and
refraining from transmitting the multi-hop attribute if the maximum hop count is met, wherein the multi-hop attribute is transmitted based on the determination to transmit;
wherein the at least one processor is configured to determine to transmit by:
filtering duplicate information attributes associated with the service from received information attributes;
determining a best path to a publisher device based on the filtered duplicate information attributes; and
determining to transmit a single multi-hop attribute for all of the filtered duplicate information attributes.

10. The first wireless device of claim 9, wherein the multi-hop attribute indicates a neighbor awareness networking (NAN) data link (NDL) attribute for the service provided by the publisher device.

11. A first wireless device for wireless communication, comprising:
a memory;
at least one processor coupled to the memory and configured to:
determine that a multi-hop feature is enabled for a service; and
transmit, based on the determination, a multi-hop attribute that includes an identifier provided by a publisher device and a shortest hop count from the first wireless device to the publisher device associated with the service;
wherein the at least one processor is further configured to receive a request to join from a third wireless device based on the transmitted multi-hop attribute; and
wherein the at least one processor is further configured to:
establish a pairwise key for communicating between the first wireless device and the third wireless device after receiving the request to join; and
transmit a common group key (CGK) that enables the third wireless device to encrypt and to decrypt group addressed traffic to and from other wireless devices associated with a neighbor awareness networking (NAN) data link (NDL) of the first wireless device.

12. A first wireless device for wireless communication, comprising:
a memory;
at least one processor coupled to the memory and configured to:
receive an information attribute from a second wireless device that indicates a multi-hop service is available from a publisher device and that includes an identifier identifying the publisher device of the multi-hop service and a shortest hop count from the second wireless device to the publisher device;
determine to subscribe to the multi-hop service based on the received information attribute; and
wherein the at least one processor is further configured to transmit a request to join to the second wireless device based on the determination to subscribe to the multi-hop service;
wherein the at least one processor is further configured to:

establish a pairwise key for communicating between the first wireless device and the second wireless device after transmitting the request to join; and receive a common group key (CGK) that enables the first wireless device to encrypt and to decrypt group addressed traffic to and from other wireless devices associated with a neighbor awareness networking (NAN) data link (NDL) of the second wireless device.

13. The first wireless device of claim 12, wherein the information attribute includes an indicator indicating a multi-hop feature is enabled for the multi-hop service.

14. The first wireless device of claim 13, wherein the second wireless device is the publisher device, and wherein the information attribute is a service descriptor attribute that indicates the identifier associated with the publisher device, and the multi-hop feature is enabled for the multi-hop service.

15. The first wireless device of claim 13, wherein the second wireless device is a proxy for the publisher device, and wherein the information attribute is a multi-hop attribute that indicates the identifier associated with the publisher device and the shortest hop count from the second wireless device to the publisher device.

16. The first wireless device of claim 15, wherein the multi-hop attribute indicates a neighbor awareness networking (NAN) data link (NDL) attribute for the multi-hop service provided by the publisher device.

* * * * *